United States Patent
Cseri et al.

(10) Patent No.: US 11,086,841 B1
(45) Date of Patent: Aug. 10, 2021

(54) STREAMS ON SHARED DATABASE OBJECTS

(71) Applicant: Snowflake Inc., Bozeman, MT (US)

(72) Inventors: Istvan Cseri, Seattle, WA (US); Dinesh Chandrakant Kulkarni, Sammamish, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 16/779,045

(22) Filed: Jan. 31, 2020

(51) Int. Cl.
| | |
|---|---|
| *G06F 16/00* | (2019.01) |
| *G06F 16/23* | (2019.01) |
| *G06F 16/2457* | (2019.01) |
| *G06F 16/17* | (2019.01) |
| *G06F 16/18* | (2019.01) |
| *G06F 16/16* | (2019.01) |
| *G06F 16/22* | (2019.01) |
| *G06F 16/182* | (2019.01) |

(52) U.S. Cl.
CPC ........ *G06F 16/2358* (2019.01); *G06F 16/162* (2019.01); *G06F 16/168* (2019.01); *G06F 16/1734* (2019.01); *G06F 16/182* (2019.01); *G06F 16/1865* (2019.01); *G06F 16/221* (2019.01); *G06F 16/2282* (2019.01); *G06F 16/24573* (2019.01)

(58) Field of Classification Search
CPC ............. G06F 16/24573; G06F 16/162; G06F 16/182; G06F 16/221; G06F 16/2282; G06F 16/1865; G06F 16/168; G06F 16/1734

USPC .......................................................... 707/609
See application file for complete search history.

(56) References Cited

U.S. PATENT DOCUMENTS

| | | | |
|---|---|---|---|
| 7,158,994 B1* | 1/2007 | Smith ............... | G06F 16/24539 707/717 |
| 9,600,543 B1* | 3/2017 | Cionca .................... | G06Q 50/10 |
| 2005/0091231 A1* | 4/2005 | Pal .......................... | G06F 16/84 |
| 2006/0206410 A1* | 9/2006 | Kostov .................. | G06Q 10/06 705/37 |
| 2006/0259524 A1* | 11/2006 | Horton ................... | G06Q 10/00 |
| 2010/0100427 A1* | 4/2010 | McKeown .......... | G06Q 10/1057 705/322 |
| 2012/0023077 A1* | 1/2012 | Kann .................... | G06F 16/275 707/702 |
| 2013/0060580 A1* | 3/2013 | Chapman ............... | G06Q 10/10 705/3 |

OTHER PUBLICATIONS

"International Application Serial No. PCT/US2020/044513, International Search Report dated Sep. 8, 2020", 2 pgs.
"International Application Serial No. PCT/US2020/044513, Written Opinion dated Sep. 8, 2020", 5 pgs.

* cited by examiner

*Primary Examiner* — Vincent F Boccio
(74) *Attorney, Agent, or Firm* — Schwegman Lundberg & Woessner, P.A.

(57) ABSTRACT

A database platform can track changes using a stream that records changes made by database transactions. Streams on views can be implemented by applying a stream to source data, and applying the view to the streamed data. Users of the database platform can query the stream on the view to review recent changes to the view, such as changes made since the last database transaction.

30 Claims, 19 Drawing Sheets

STREAMS ON SHARED DATABASE OBJECTS

TECHNICAL FIELD

The present disclosure generally relates to special-purpose machines that manage databases and improvements to such variants, and to the technologies by which such special-purpose machines become improved compared to other special-purpose machines for recording changes to databases.

BACKGROUND

Change tracking systems for database records can record changes to one or more tables in a data structure, such as a history log. Conventionally, a given user can enable tracking changes on their own data (e.g., data they load into their own database); however, change tracking can be difficult to implement on data owned and managed by another user.

BRIEF DESCRIPTION OF THE DRAWINGS

Various ones of the appended drawings merely illustrate example embodiments of the present disclosure and should not be considered as limiting its scope.

FIG. 7A-7E show example user interfaces sharing data using the network-based data warehouse system, according to some example embodiments.

DETAILED DESCRIPTION

Figure 1:
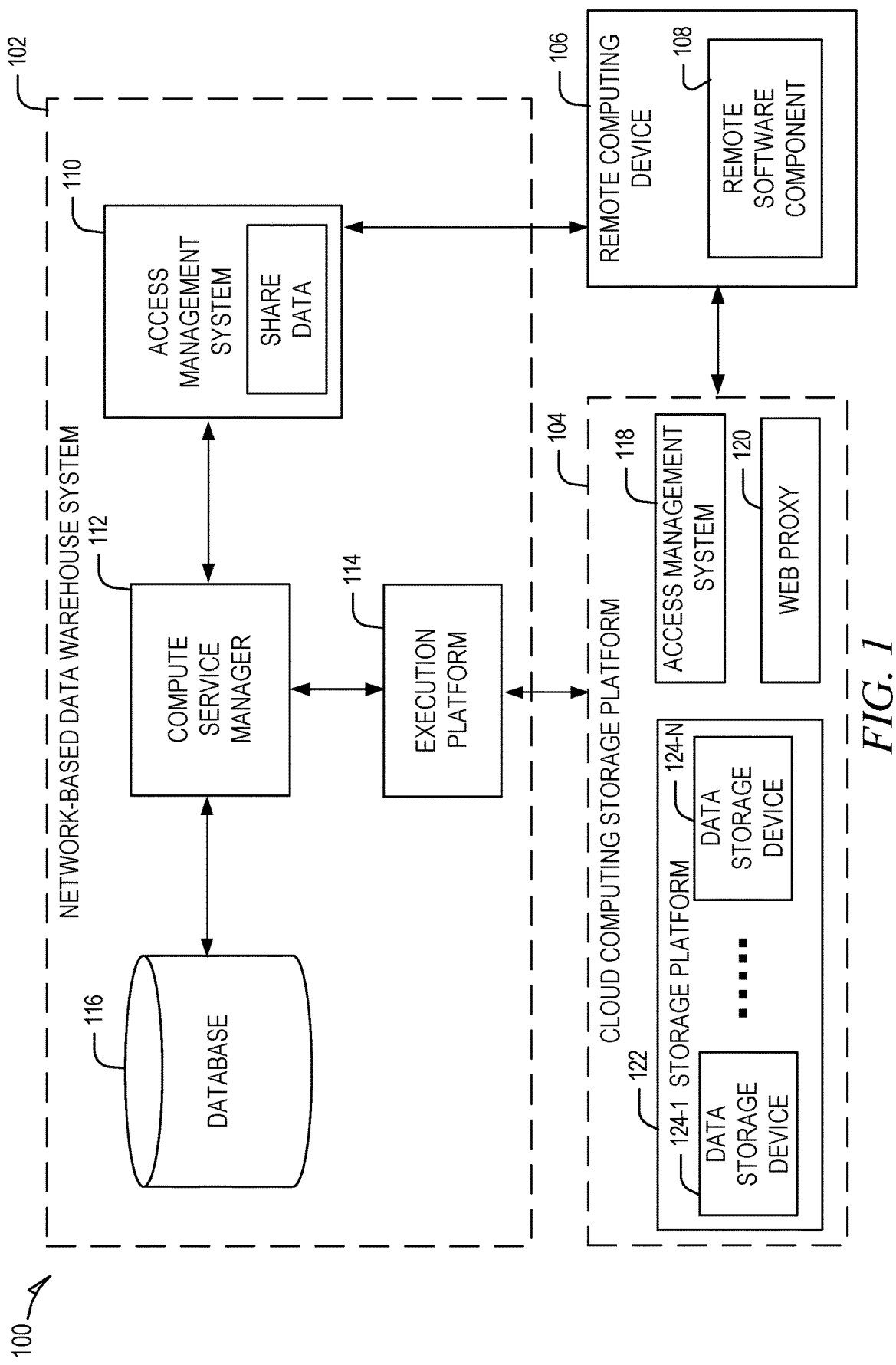
FIG. 1 illustrates an example computing environment in which a network-based data warehouse system can implement streams on shared database objects, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail As discussed, it can be difficult for a given user to track changes to database data managed by another user. One issue is that the user who wants to track changes on another user's database data (e.g., table) may not have the privilege or authorization to enable change tracking. For example, a database view can incorporate data from an underlying source table, and a owner of the data can share the view with another user. While the other user has access to the database view, the other user may not have access to the underlying source table, and such access is required to enable change tracking. Thus the other user can access the view but not track changes made to the view (or underlying table). One approach is for the other user to poll the tracked database item (e.g., table, view) and/or perform check row counts to identify whether any updates or changes have occurred, but such an approach is inefficient and creates network overhead.

To this end a stream share engine can be implemented to create stream objects that can track changes on a database view of one or more source tables. As used here, a view is a database object that allows the result of a query to be accessed as if it were a table. The query for a given view can be specified, for example, using a CREATE VIEW statement. Further, a secure view is a database view with restrictions, such as disabling user defined functions (UDFs) and other features (e.g., programmatic functions) to limit access to the underlying source data (e.g., one or more tables) from which the secure view pulls its data. In some example embodiments, a database stream object is a database object that can track data manipulations made to tables (e.g., insert, update, delete) using one or more transactions. A transaction is a set of SQL statements (e.g., reads, writes) that are processed as a unit. All the statements in the transaction are either applied (e.g., committed) or undone (e.g., rolled back) as a single unit. In some example embodiments, a transaction is associated with a single session and multiple sessions cannot share the same transaction. A transaction can be started explicitly by executing a "begin" statement. After a transaction has been started, it is dosed by executing either a "commit" or "rollback" statement. A stream can be created to track a table at a given time, and when the stream is created several metadata columns can be added to the source table to track changes. A more in-depth example of capturing change data using stream objects is discussed below with reference to FIG. 8. Continuing, and in accordance with some example embodiments, a view can be created for a given table, and a request can be received (e.g., from a database end-user or admin) to track changes on the view.

To enable streaming of the changed data from views, the request to apply a stream to a view is instead implemented by applying a stream to the underlying source table (e.g., view base table), and then applying a view to the resulting stream data. To the end-user, it appears as if the stream object is tracking the view of the table, when instead the stream object is being applied to the table directly, and the view is applied on top of the streamed data. In this way, the stream share engine can implement streams on views, where there are data restrictions on the tracked data (e.g., secure view, limited access to source tables), and where the database objects are shared between different data providers and consumers of a shared distributed database system.

FIG. 1 illustrates an example shared data processing platform 100 in which a network-based data warehouse system 102 implements database stream tracking (e.g., view streams), in accordance with some embodiments of the present disclosure. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based data warehouse system 102, a cloud computing storage platform 104 (e.g., a storage platform, an AWS® service such as S3, Microsoft Azure®, or Google Cloud Services®), and a remote computing device 106. The network-based data warehouse system 102 is a network-based system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based data warehouse system 102.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based data warehouse system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can be a data provider or data consumer that enables database tracking procedures, such as streams on shared tables and views, as discussed in further detail below.

The network-based data warehouse system 102 comprises an access management system 110, a compute service manager 112, an execution platform 114, and a database 116. The access management system 110 enables administrative users to manage access to resources and services provided by the network-based data warehouse system 102. Administrative users can create and manage users, roles, and groups, and use permissions to allow or deny access to resources and services. The access management system 110 can store share data that securely manages shared access to the storage resources of the cloud computing storage platform 104 amongst different users of the network-based data warehouse system 102, as discussed in further detail below.

The compute service manager 112 coordinates and manages operations of the network-based data warehouse system 102. The compute service manager 112 also performs query optimization and compilation as well as managing dusters of computing services that provide compute resources (e.g., virtual warehouses, virtual machines, EC2 dusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based data warehouse system 102 and its users. For example, data to be tracked via streams can be stored and accessed on the cloud computing storage platform 104 (e.g., on S3) or stored and accessed on the database 116 that is local to the network-based data warehouse system 102, according to some example embodiments.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-$n$ that are part of a cloud computing storage platform 104. In some embodiments, data storage devices 124-1 to 124-$n$ are cloud-based storage devices located in one or more geographic locations. For example, data storage devices 124-1 to 124-$n$ may be part of a public cloud infrastructure or a private cloud infrastructure. Data storage devices 124-1 to 124-$n$ may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and an web proxy 120. As with the access management system 110, the access management system 118 allows users to create and manage users, roles, and groups, and use permissions to allow or deny access to cloud services and resources. The access management system 110 of the network-based data warehouse system 102 and the access management system 118 of the cloud computing storage platform 104 can communicate and share information so as to enable access and management of resources and services shared by users of both the network-based data warehouse system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based data warehouse system 102 based on the changing data storage/retrieval needs as well as the changing needs of the users and systems accessing the shared data processing platform 100. The support of dynamic changes allows network-based data warehouse system 102 to scale quickly in response to changing demands on the systems and components within network-based data warehouse system 102. The decoupling of the computing resources from the data storage devices 124 supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based data warehouse system 102 is dynamic and supports regular changes to meet the current data processing needs.

During typical operation, the network-based data warehouse system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-n in the cloud computing storage platform 104. Thus, the computing resources and cache resources are not restricted to specific data storage devices 124-1 to 124-n. Instead, all computing resources and all cache resources may retrieve data from, and store data to, any of the data storage resources in the cloud computing storage platform 104.

Figure 2:
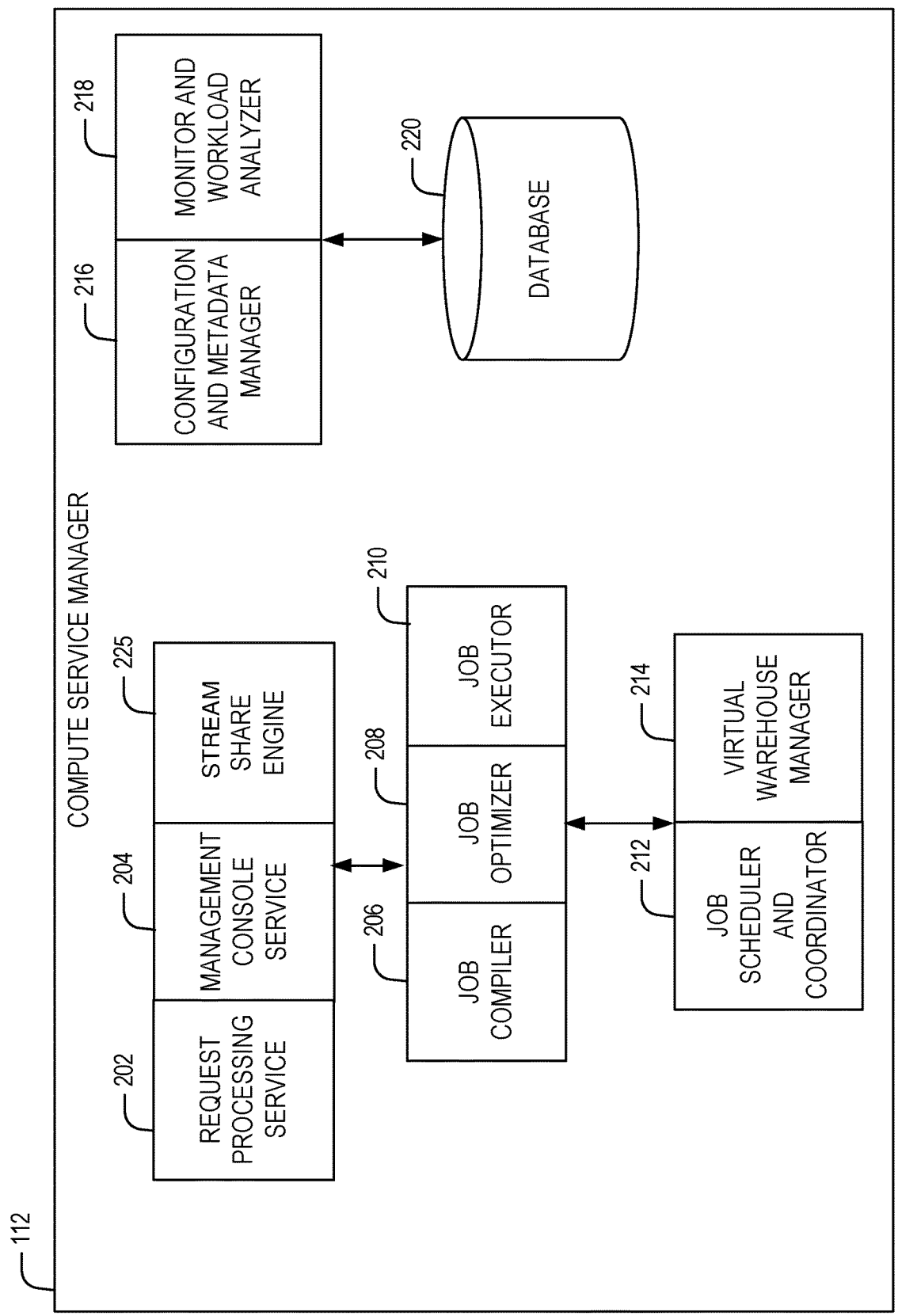
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system. The stream share engine 225 manages change tracking on database objects, such as a data share (e.g., shared table) or shared view, according to some example embodiments, and as discussed in further detail below.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, a operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based data warehouse system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represent any data storage device within the network-based data warehouse system 102. For example, data storage device 220 may represent caches in execution platform 114, storage devices in cloud computing storage platform 104, or any other storage device.

Figure 3:
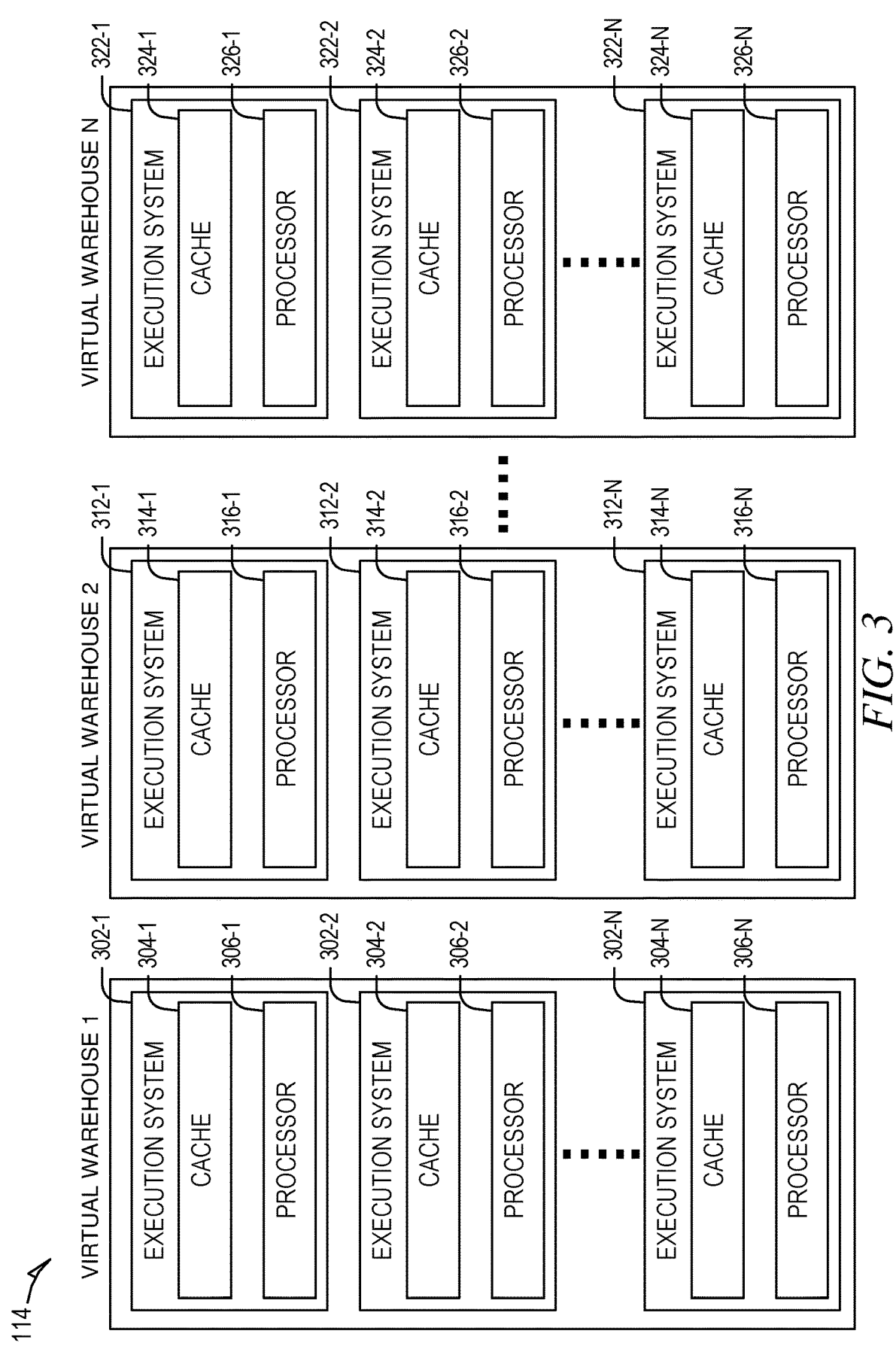
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-n shown in FIG. 1. Thus, the virtual warehouses are not necessarily assigned to a specific data storage device 124-1 to 124-n and, instead, can access data from any of the data storage devices 124-1 to 124-n within the cloud computing storage platform 104. Similarly, each of the execution nodes shown in FIG. 3 can access data from any of the data storage devices 124-1 to 124-n. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-n. Execution node 302-1 includes a cache 304-1 and a processor 306-1. Execution node 302-2 includes a cache 304-2 and a processor 306-2. Execution node 302-n includes a cache 304-n and a processor 306-n. Each execution node 302-1, 302-2, and 302-n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-n. Execution node 312-1 includes a cache 314-1 and a processor 316-1. Execution node 312-2 includes a cache 314-2 and a processor 316-2. Execution node 312-n includes a cache 314-n and a processor 316-n. Additionally, virtual warehouse 3 includes three execution nodes 322-1, 322-2, and 322-n. Execution node 322-1 includes a cache 324-1 and a processor 326-1. Execution node 322-2 includes a cache 324-2 and a processor 326-2. Execution node 322-n includes a cache 324-n and a processor 326-n.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternate embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefor be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large duster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-*n* at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4A:
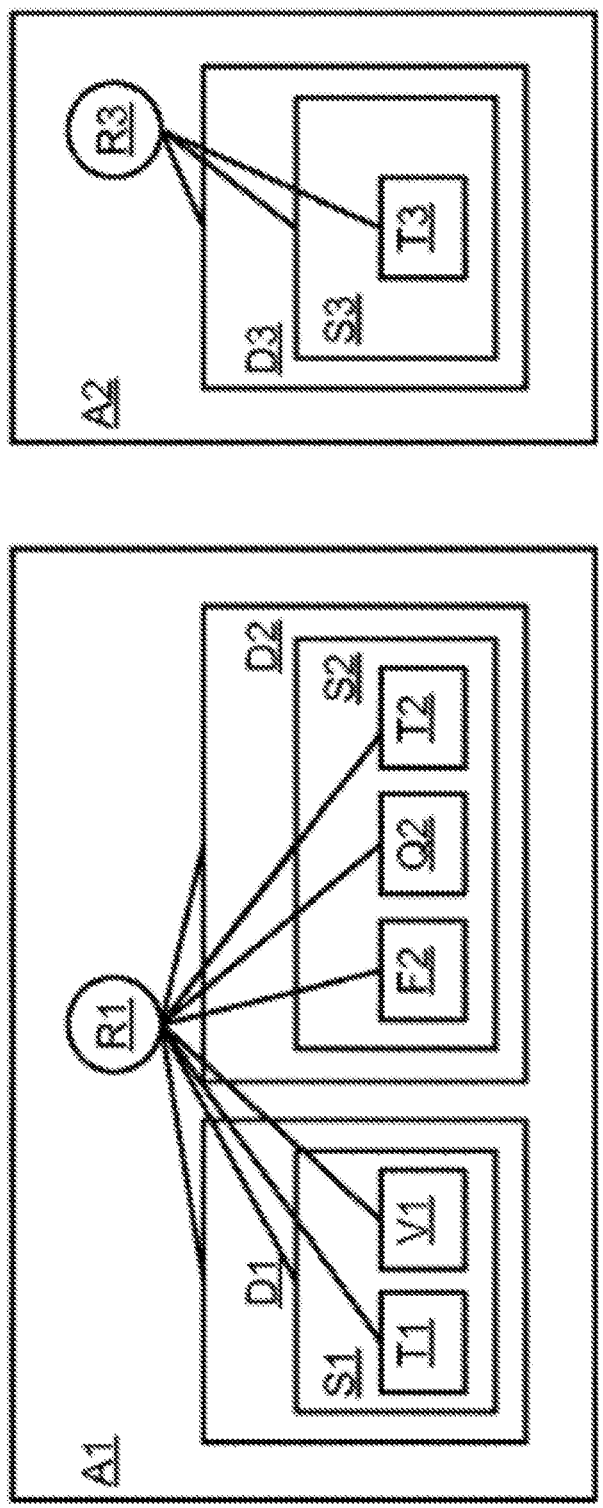
FIGS. 4A-4C show example data architectures for sharing database objects, according to some example embodiments.
Figure 4B:
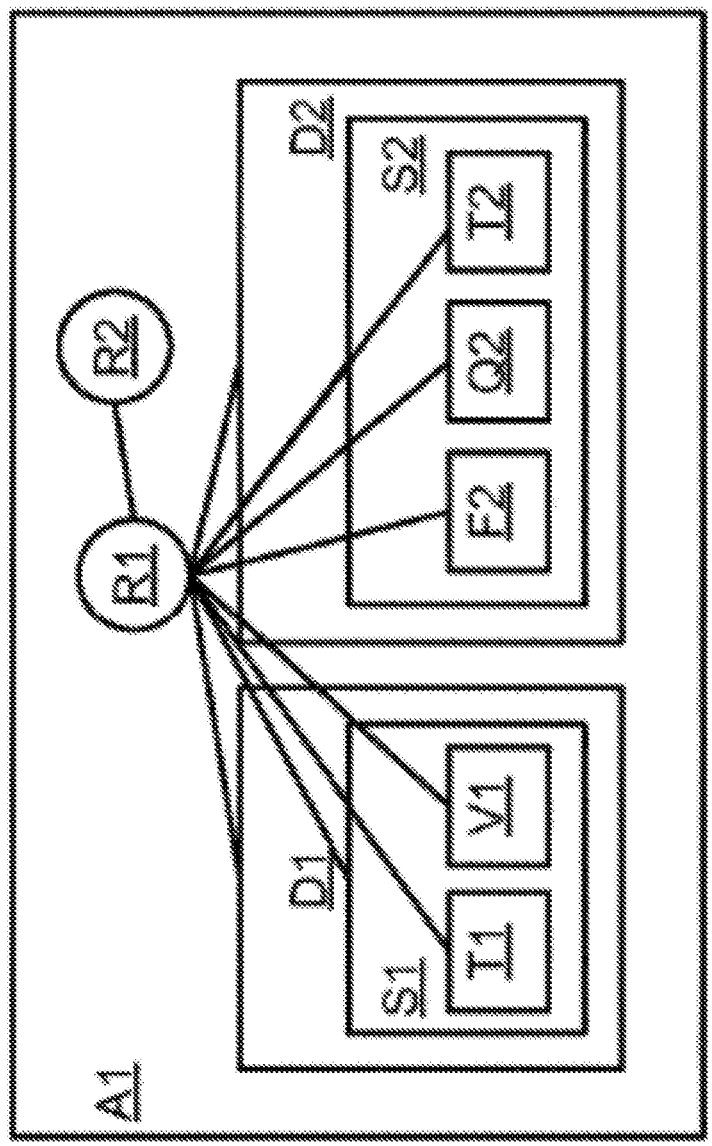
Figure 4C:
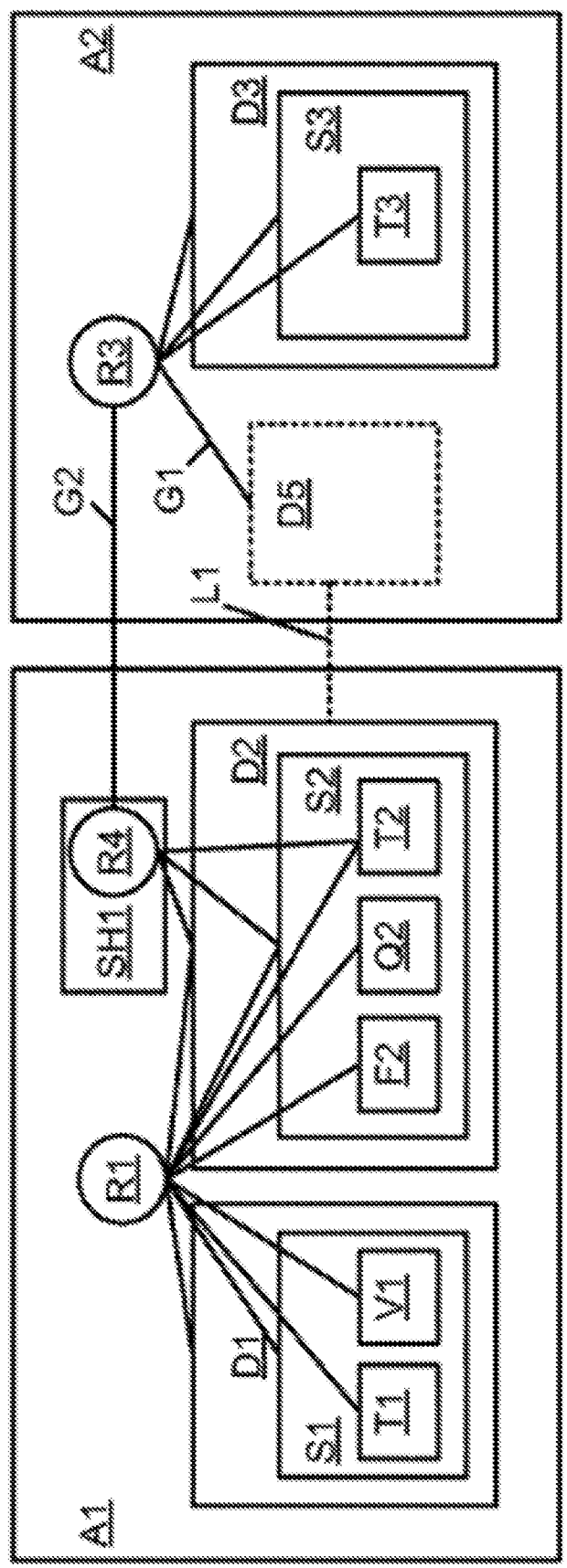

FIGS. 4A-4C show example data architectures for sharing database objects using network-based data warehouse system 102, according to some example embodiments. As discussed, the access management system 110 can manage share data for sharing data between storage devices (e.g., different storage devices of a single account or sharing data in a storage device allocated to a first sharer account to a second consumer account). In some example embodiments, the access management system 110 implements role-based access control to govern access to objects in customer accounts. The role-based access control consists of two mechanisms: roles and grants. In one embodiment, roles are special objects in an end-user account (e.g., provider account, consumer account) that are assigned to users. Grants between roles and database objects define what privileges a role has on these objects. For example, a role that has a usage privilege granted on a database can "see" this database when executing the command "show databases"; a role that has a select privileged grant on a table can read from this table but not write to the table. The role would need to have an update privilege to modify the grant on the table to be able to write to it.

FIG. 4A is a schematic block diagram illustrating role-based access to objects in customer accounts of a multi-tenant shared database platform (e.g., cloud computing storage platform 104 as accessed by system 102), according to some example embodiments. In the following examples, a user account "A1" corresponds to a data provider account that manages a data provider virtual warehouse (e.g., virtual warehouse 1 in FIG. 3A) and another different user account A2 corresponds to a data consumer account that initiates data consumer virtual warehouses (e.g., virtual warehouse 2 in FIG. 3A).

As illustrated, the A1 account contains role R1, which has grants to all objects in the object hierarchy. Assuming these grants are usage grants between R1 and database objects D1 and D2, streams S1 and S2, and select grants between R1 and table object T, view object V1, function object F2, sequence object Q2, table object T2, a user with activated role R1 can see all objects and read data from all tables, views, and sequences and can execute function F2 within account A1.

The account A2 contains role R3, which has grants to all objects in the object hierarchy. Assuming these grants are usage grants between R3 and D3, S3, and select a grant between R3 and T3, a user with activated role R3 can see all objects and read data from all tables, views, and sequences within account A2.

FIG. 4B illustrates a grant between roles. With role-based access control, it is also possible to grant usage from one role to another role. A role that has a usage grant to another role "inherits" all access privileges of the other role. For example, role R1 is granted to role R2 (in other words role R2 has a usage grant on role R1). A user (e.g., with corresponding authorization details) with activated role R2 can see and read from all objects because role R2 inherits all grants from role R1.

According to one embodiment, usage grants are granted across different accounts. An account that shares data may be referred to herein as a "sharer account" or "provider account" and an account with which the data is shared may be referred to herein as a "target account" or "consumer account". Some embodiments disclosed herein allow for instantaneous, zero-copy, easy-controllable cross-account sharing of data. In some embodiments, in order to share data with another account, a sharer account may generate a share object. Within the share object, a role may be created and a user of the sharer account may indicate access rights or grants that are available to the role and/or foreign accounts (or target accounts) that will be granted rights under the role. A target account may then be able to identify share objects or roles in other accounts to which the target account has been granted rights or access. In one embodiment, share objects in a sharer account may be imported into the target account using alias objects and cross-account role grants.

The sharer account creates a new type of object, the share object. The share object has a unique name to be identified within the sharer account. For example, the name may need to be unique within an account, but not necessarily across accounts. Share objects may be created, modified, and deleted by referencing them via their name in the sharer account.

In some embodiments, each share object contains a single role. Grants between this role and objects define what objects are being shared and with what privileges these objects are shared. The role and grants may be similar to any other role and grant system in the implementation of role-based access control. By modifying the set of grants attached to the role in a share objects, more objects may be shared (by adding grants to the role), fewer objects may be shared (by revoking grants from the role), or objects may be shared with different privileges (by changing the type of grant, for example to allow write access to a shared table object that was previously read-only).

In one embodiment, a share objects also contains a list of references to other customer accounts. Only these accounts that are specifically in the share object may be allowed to look up, access, and/or import from this share object. By modifying the list of references of other customer accounts, the share object can be made accessible to more accounts or be restricted to fewer accounts FIG. 4C is a schematic block diagram illustrating logical grants and links between different accounts. A database alias object D5 is created in account A2. Database alias D5 references database D2 via link L1. Role R3 has a usage grant G1 on database D5. Role R3 has a second usage grant G2 to role R4 in customer account A1. Grant G2 is a cross-account grant between accounts A1 and A2. Role-based access control allows a user in account A2 with activated role R3 to access data in account A1. For example, if a user in account A2 wants to read data in table T2, role-based access control allows that because role R3 has a usage grant of role R4 and role R4, in turn, has a select grant on table T2. By way of illustration, a user with activated role R3 may access T2 by running a query or selection directed to "D5.S2.T2" (where access to T2 is through S2 and D5).

Using object aliases and cross-account grants from a role in the target account to a role in the sharer account allows users in the target account to access information in the sharer account. In this way, a database system may enable sharing of data between different customer accounts in an instantaneous, zero-copy, easily controllable fashion. The sharing can be instantaneous because alias objects and cross-account grants can be created in milliseconds. The sharing can be zero-copy because no data has to be duplicated in the process. For example, all queries, or selections can be made directly to the shared object in the sharer account without creating a duplicate in the target account. The sharing is also easy to control because it utilizes easy-to-use techniques of role-based access control. Additionally, in embodiments with separated storage and compute, there is no contention among computing resources when executing queries on shared data. Thus, different virtual warehouses in different customer accounts may individually process shared data. For example, a first virtual warehouse for a first account may process a database query or statement using data shared by a sharer account and a second virtual warehouse for a second account, or the sharer account, may process a database query or statement using the shared data of the sharer account.

Figure 5:
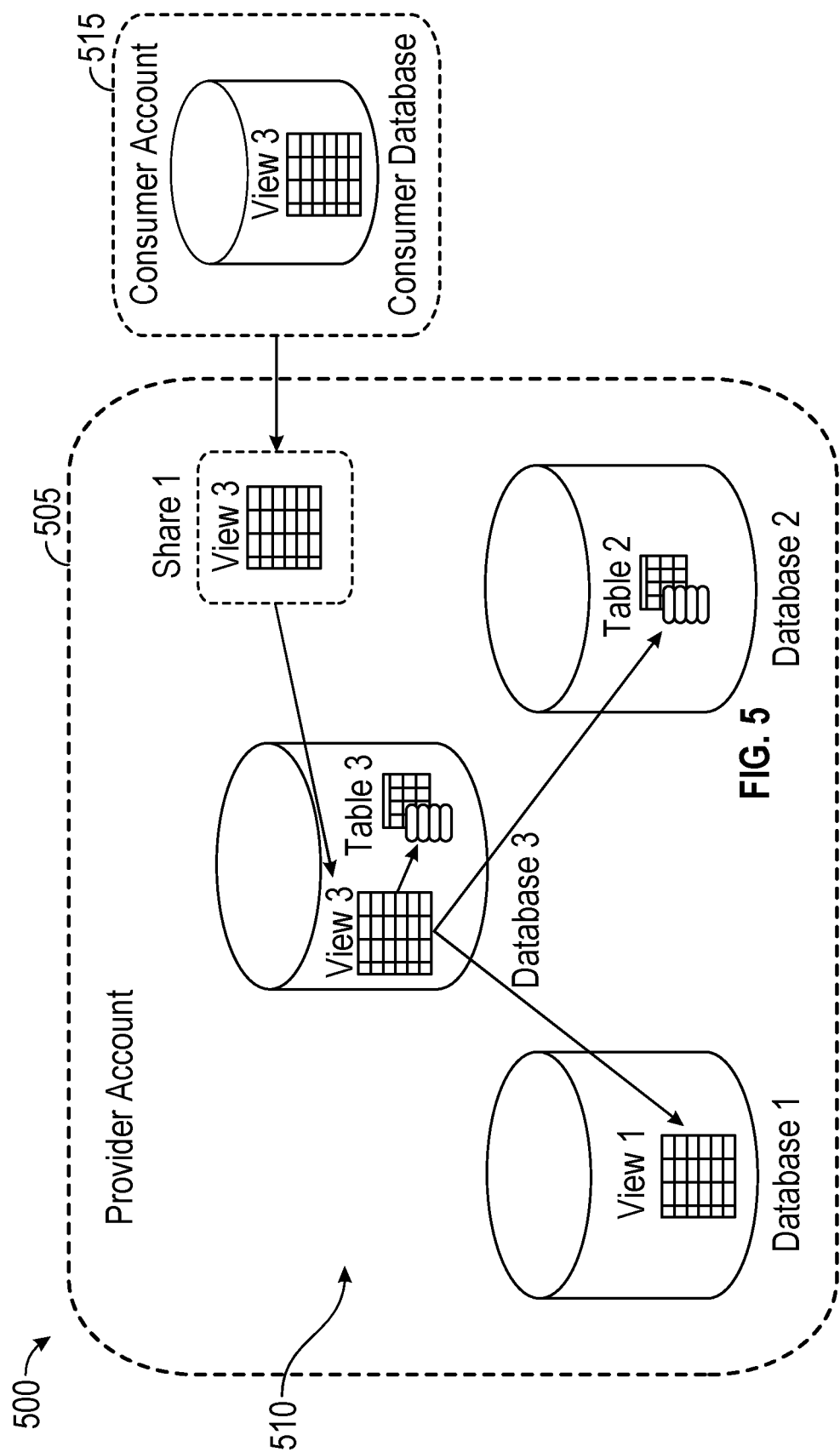
FIG. 5 shows an example database architecture for sharing data between entities, according to some example embodiments.

FIG. 5 shows an example database architecture 500 for sharing data between entities (e.g., users) using the shared data processing platform 100, according to some example embodiments. In the example displayed, a data provider account 505 corresponds to a user device (e.g., laptop) of a user (e.g., an account of a first user at a first company, department, etc., that creates and stores data) logged in as an administrator of the data 510. For instance, provider account 505 generates and stores the data in the shared data processing platform 100. The data 510 can include data that is uploaded to the network-based data warehouse system 102 (e.g., for storage in database 116 or caches of nodes in execution platform 114, or data that is located on the cloud computing storage platform 104). The consumer account 515 corresponds to a user device of another user (e.g., another user at another company, different department within the same company, etc., using a laptop to log in and create an active session of consumer account 515) with which the provider account 505 seeks to share the data 510 via the shared data processing platform 100. For example, data provider account 505 and data consumer account 515 can both be run from different remote computing devices, such as remote computing device 106, that can access, modify or otherwise process data 510 using network-based data warehouse system 102 (e.g., based on permissions, roles, session information managed by access management system 110 and/or access management system 118). In the illustrated example, the data 510 includes databases (e.g., database1, database2, database3). Each database consists of one or more schemes, which are groups of database objects, such as tables (e.g., table2, table3), views (e.g., view1, view3), and shares (e.g., share1).

Figure 6:
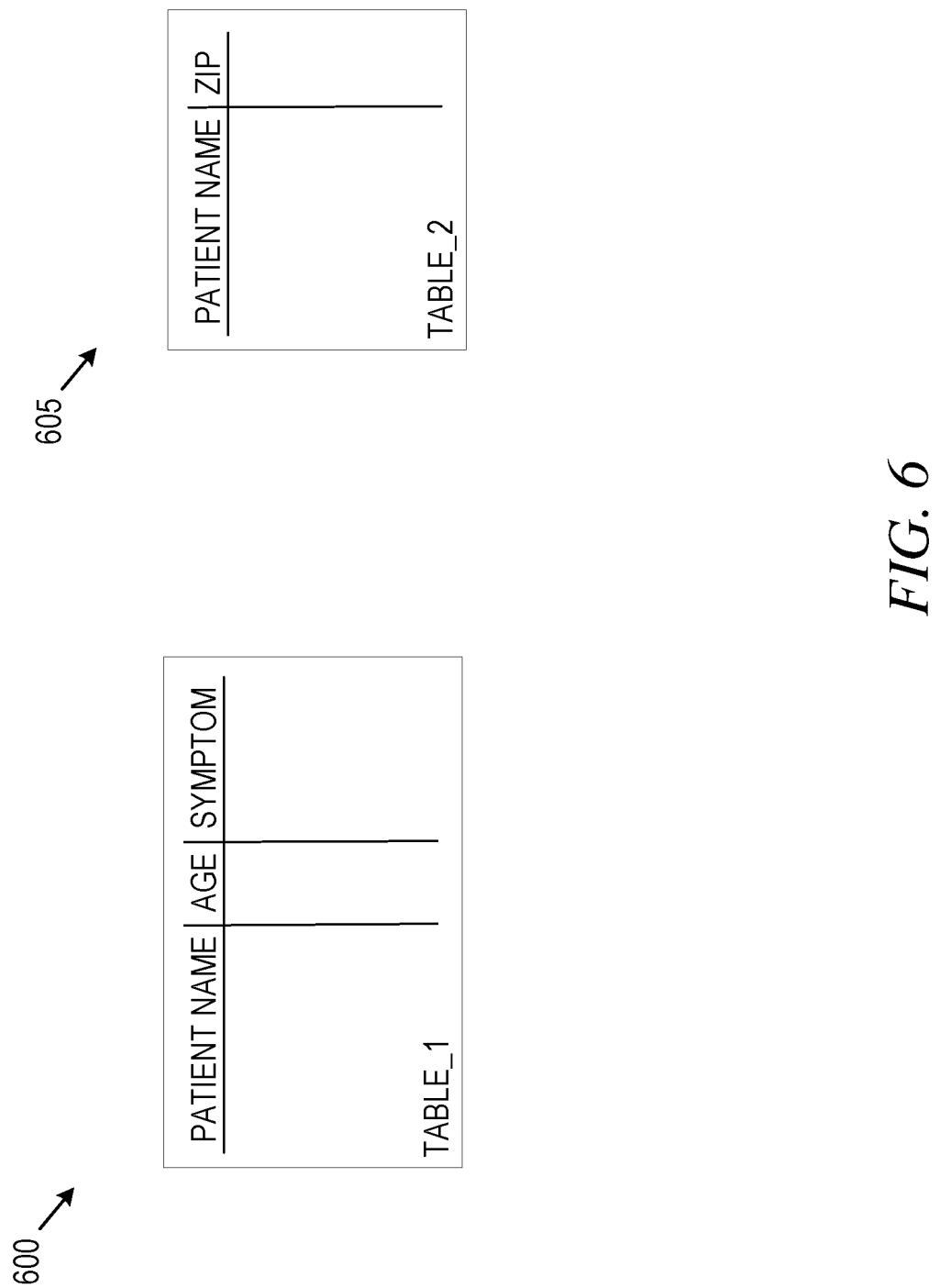
FIG. 6 shows example database objects, according to some example embodiments.

In tables, the data is relational database data structured as collections of columns and rows, where tables can include references to other tables (e.g., keys, indices, shared columns such as consumer name). For instance, with reference to FIG. 6, a first table 600 comprises three columns (patient name, age, and symptom) with rows for each patient, and a second table 605 comprises two columns (patient name, zip) where the patient names are identical columns used to reference a given patient/user. For instance, a join operation or view can be created from the first table 600 and the second table to show zip codes where different symptoms have appeared (e.g., by creating a view or new table using the patient name, symptom, and zip columns). Although relational database structures are discussed here as examples, it is appreciated that in some example embodiments the data managed by the shared data processing platform 100 can be data structured in a non-relational database format (e.g., no-SQL, Hadoop, Spark frames, etc.).

Returning to FIG. 5, as discussed, a view is a database object that displays data from one or more tables (e.g., displaying certain columns, with a customized view schema). A view allows the result of a query to be accessed as if the view is itself a table. A share is an object that is custom to the shared data processing platform 100 that can be used to share data between users of the network-based data warehouse system 102 in an efficient and secure manner. A share object comprises all information used to share a given database. Each share includes privileges that grant access to the databases and schema containing the objects to share, the privileges that grant access to specific objects (e.g., tables, secure views), and the consumer accounts with which the database and its objects are shared. After a given database is created (e.g., by data provider account 505) the shared objects can be made available for access and/or manipulation by other users (e.g., the consumer account 515) via cloud computing storage platform 104. For example, the provider account 505 can create one or more database instances and then load the data 510 into the database instances, create views and/or shared objects, and further create consumer accounts (e.g., reader accounts) that can access the database objects via the network-based data warehouse system 102, and no data needs to be transferred between the accounts; instead, the shared data is accessed directly on the originating storage device. For instance, the consumer account 515 can login using a browser to access a page, generate a read-only database (e.g., "consumerDatabase"), and populate the shared data (e.g., "view3") in the database for analysis without having to copy data from the storage device that stores the shared data.

Figure 7A:
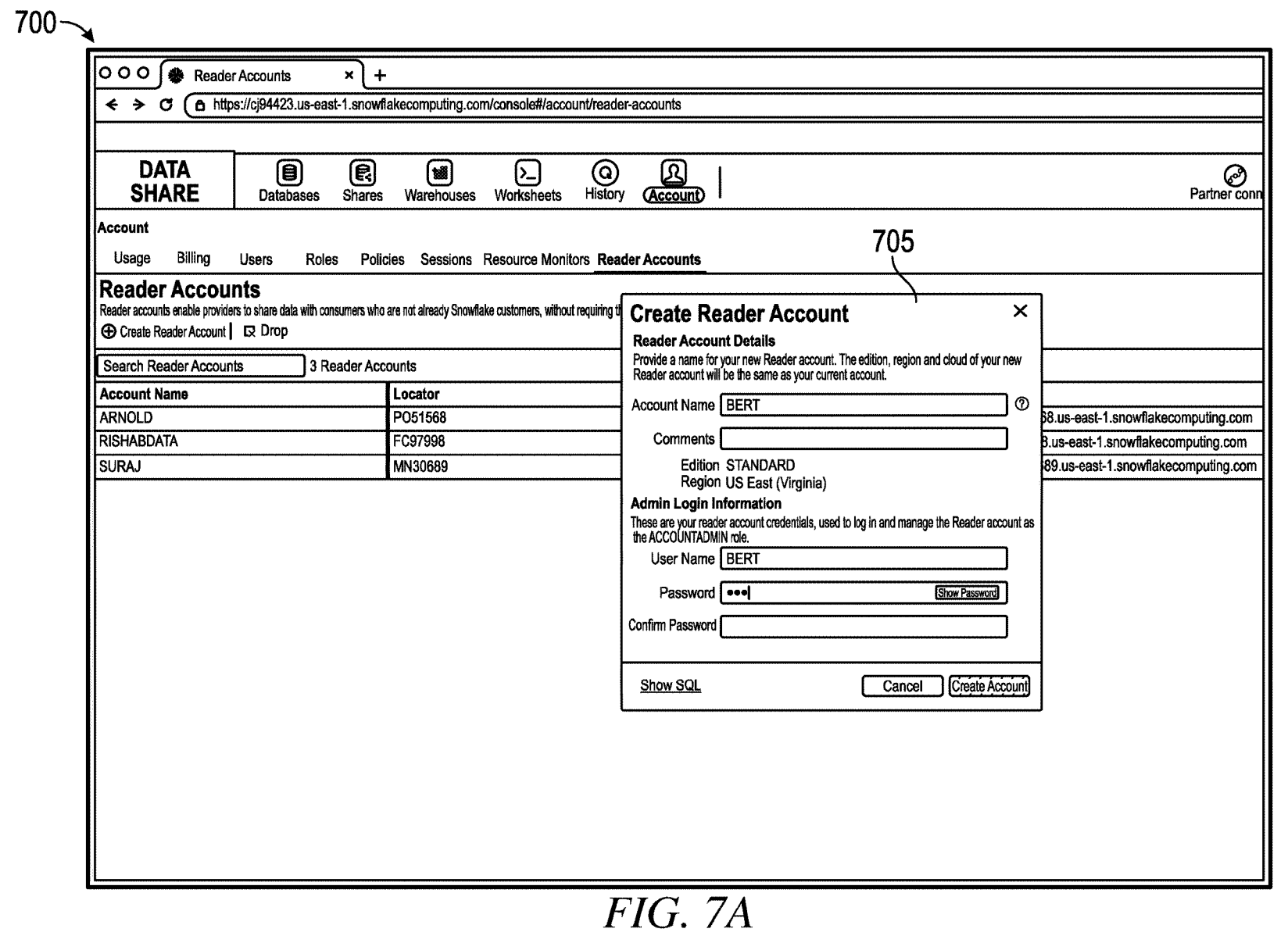
Figure 7B:
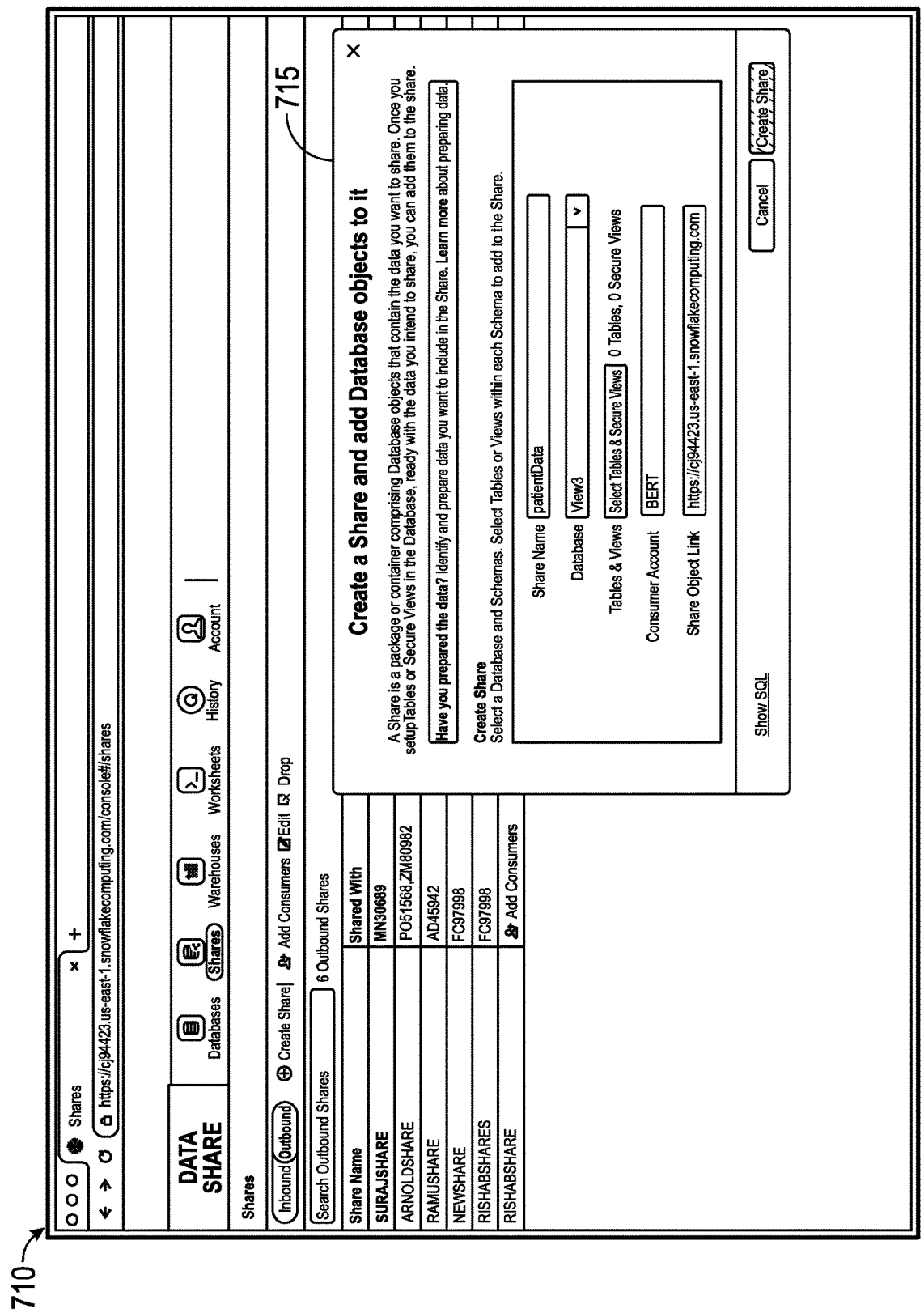
Figure 7C:
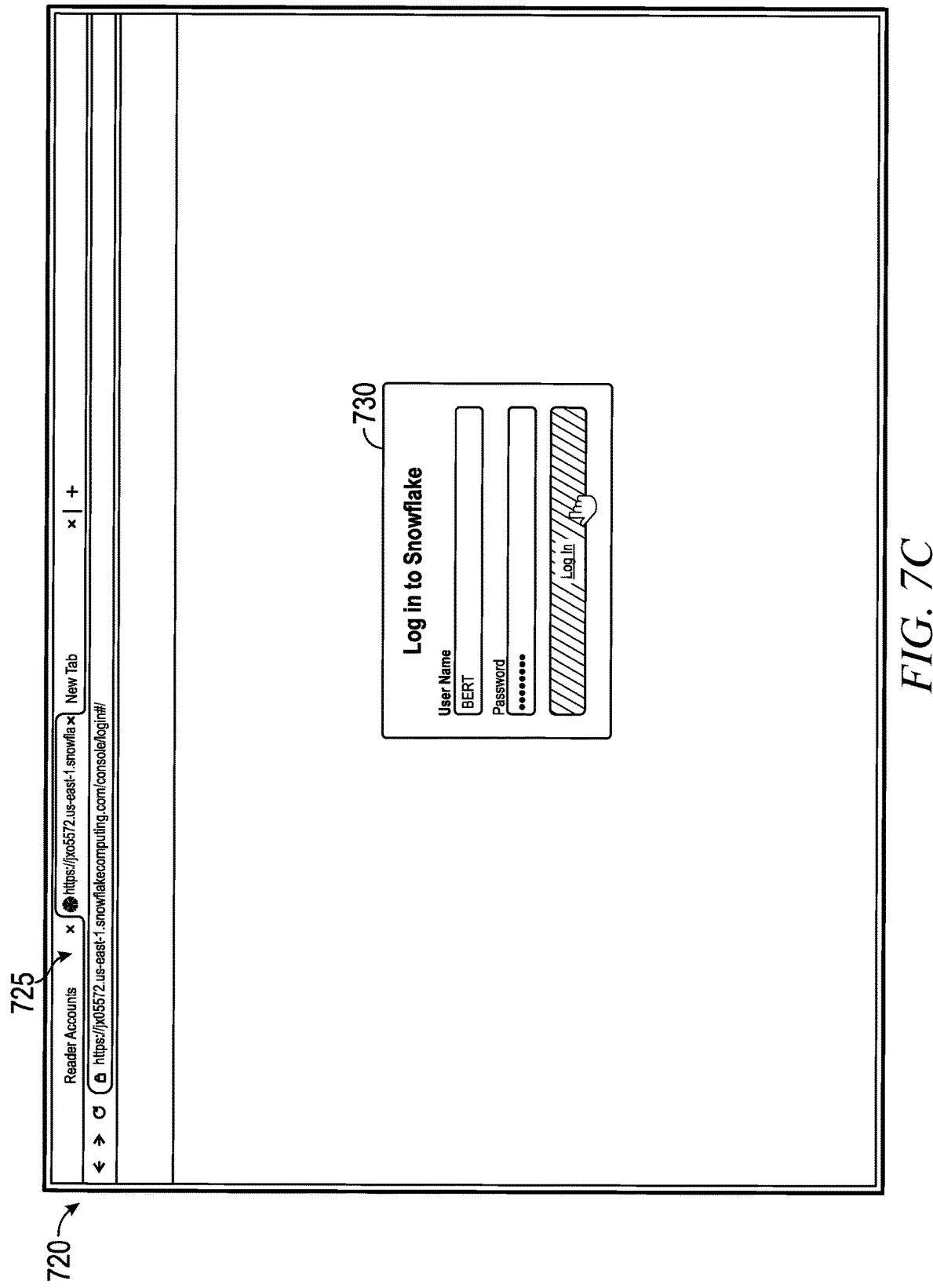
Figure 7D:
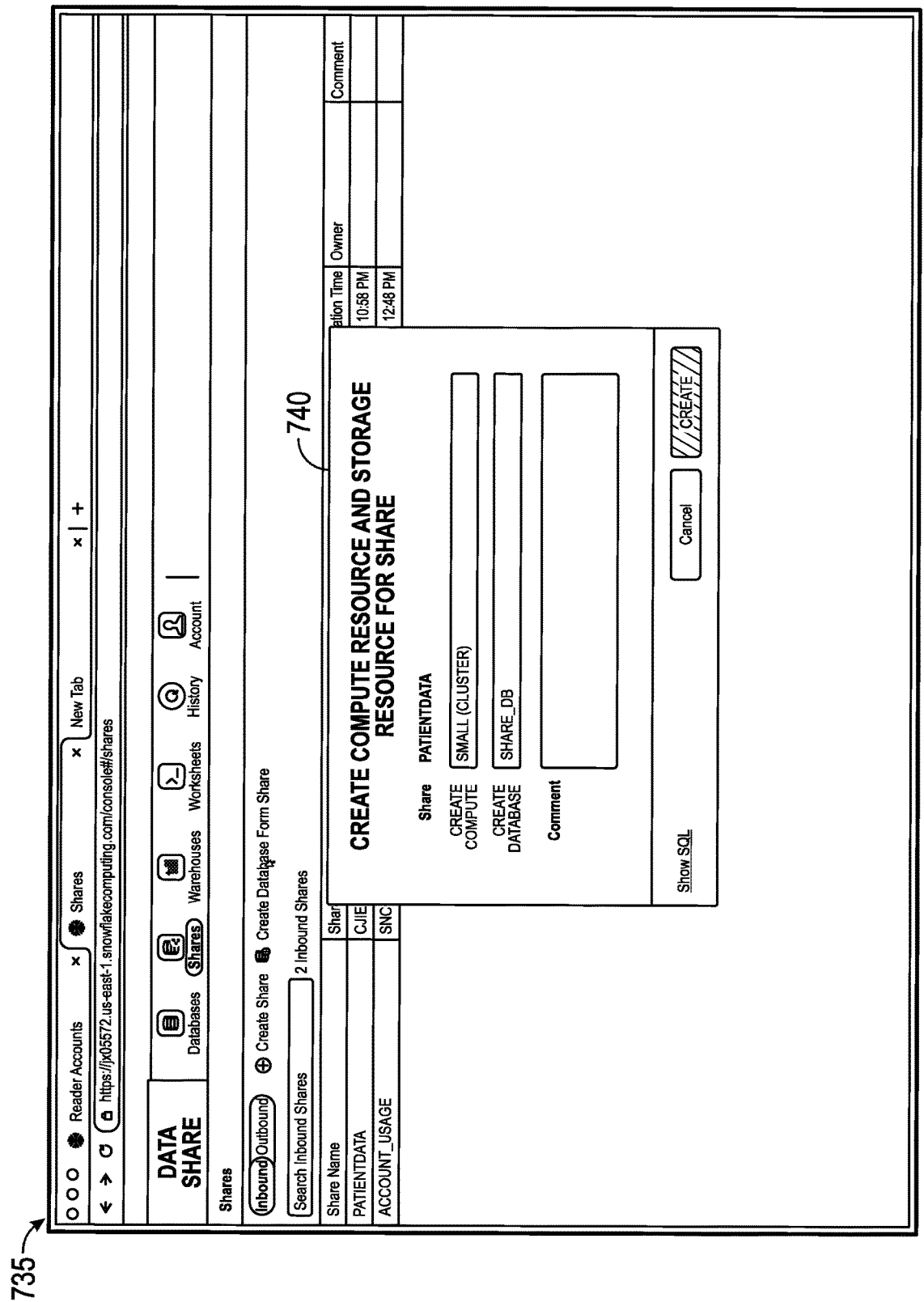
Figure 7E:
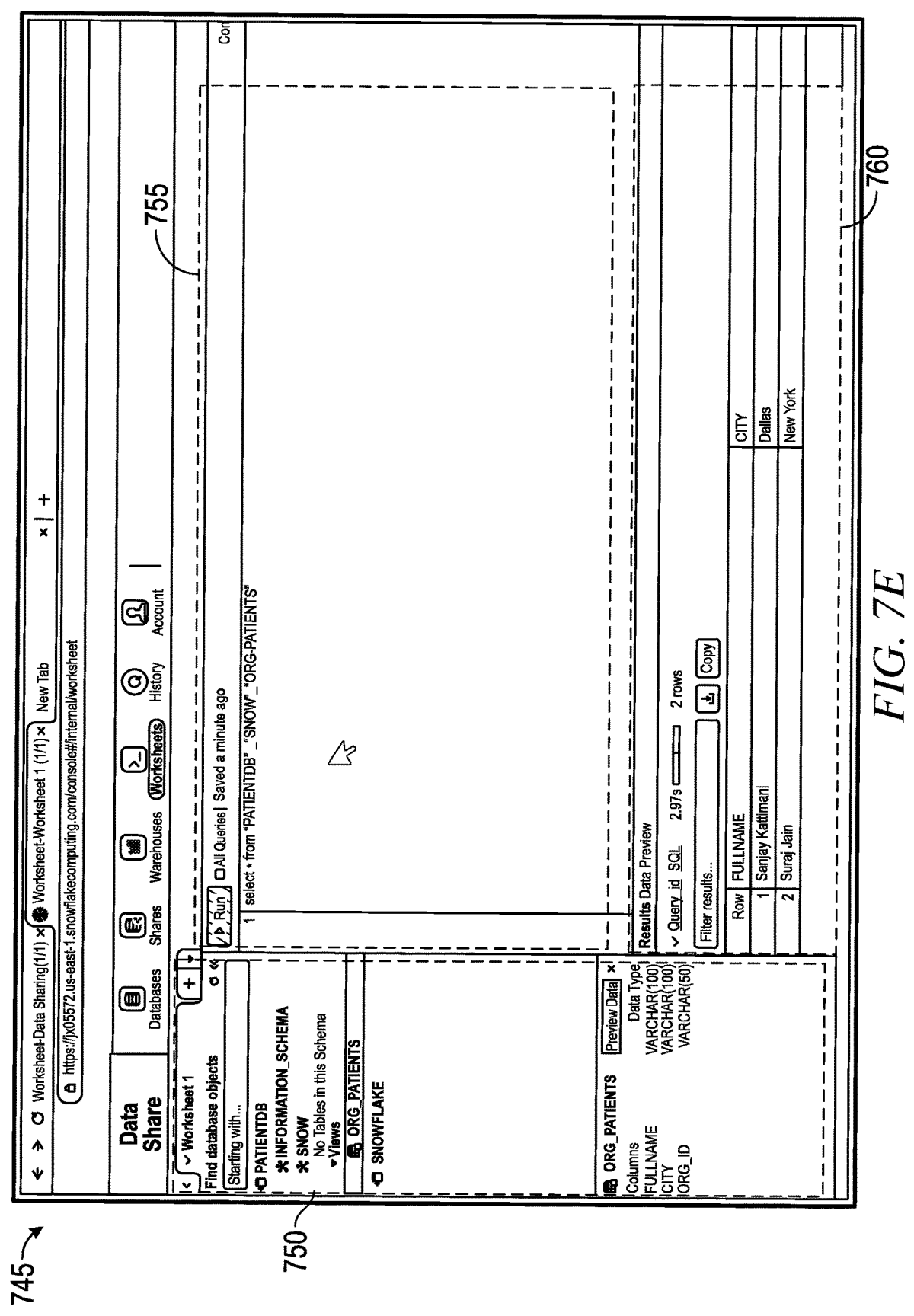

FIGS. 7A-7E show example user interfaces for managing data using the shared data processing platform 100, according to some example embodiments. In the illustrative example, FIGS. 7A and 7B correspond to Internet browser user interfaces displayed on a device of the data provider account 505 (e.g., a laptop) and FIGS. 7C-7E are example Internet browser user interfaces displayed on another device of another user logged in as the consumer account 515. While Internet browser user interfaces are discussed in the illustrated examples, it is appreciated that the user interfaces can similarly be integrated into other applications, such as native applications of a client device operating system (e.g., a mobile application on a smartphone, a Linux application on a Linux laptop, windows application on a Windows enabled laptop, etc.).

In FIG. 7A, the user interface 700 displays a window 705 for creating reader accounts. The window 705 includes fields to create an account name (e.g., the name of the consumer account 515, such as "bert" a data analyst in 3rd party company), and login fields such as a user name field and password field. Upon selecting "Create Account" button in window 705, the consumer account 515 is created and linked to the provider account 505 on the shared data processing platform 100 (e.g., via access management system 110 and access management system 118).

In FIG. 7B, the user interface 710 displays a window 715 for creating a share object and adding database objects (e.g., tables, views) to the share object and specifying share object access (e.g., consumer accounts with which the share object is shared). For example, the "share name" field allows the share object to be named, the "database" field allows database objects to be included in the share object, such as the view3. The window 715 further includes a "consumer account" field that gives access to one or more consumer accounts (e.g., Bert) to the shared object, and a Share Object link, which is a URL to the consumer account 515 (e.g., a URL to a network service instance of consumer account 515).

Based on the user selecting the create button in window 715, the share object is created and access to the share object is assigned to the consumer account 515 (e.g., Bert's account). The share object link can be copied by the provider account and sent to other users (e.g., Bert) along with login information (e.g., username, password) to access and activate the consumer account 515 (e.g., a consumer account session as a network service).

FIG. 7C shows a user interface 720 displaying a login window 730 for accessing share objects, according to some example embodiments. In illustrative example, the user "Bert" receives the share object URL, the username, and password information (e.g., via email) and displays the user interface 720 using the share object URL in an address bar 725 of an Internet Browser. Upon inputting the correct information into the user name and password fields (e.g., the username and password data discussed in FIG. 7A above) and selecting the login button, a consumer account session is activated on the network-based data warehouse system 102 for the consumer account 515. In the consumer account session, the user can create additional database, query data, modify data, and access data objects shared with the consumer account (e.g., the share object created and shared by provider account 505).

FIG. 7D shows a user interface 735 displaying a window 740 that may be used to create a database instance, according to some example embodiments. The user interface 735 can be displayed in response to the login button being selected with the correct information populating the login and password fields. The window 740 can be used by the consumer account 515 to create compute resources (e.g., virtual warehouses) and database instances into which the share object (e.g., a read-only database that displays patient data) is shared. For instance, using the create compute element, a drop-down menu is displayed that allows the consumer (e.g., data consumer, consumer account 515) to create virtual warehouses of different sizes (e.g., different size EC2 dusters, such as a small duster, medium duster, and large duster), and generate a database on the virtual warehouse where the data populated into the database is from the storage device of the provider account. As discussed, the compute resources and the storage resources are decoupled and the consumer account 515 can manage (e.g., set up payment, create, alter, terminate) virtual warehouses to access the share object data or other data (e.g., new data generated by another user of the consumer account, which is unrelated to the share object data).

The window 740 further includes an identifier ("Share Data") that indicates what shared data will be loaded into the database instance created on the consumer account's virtual warehouse ("Patient Data"), and a database name field that allows the consumer account 515 to name the newly created database that is populated by the share object data. In response to receiving a selection of the create database button in window 740, a new virtual warehouse is generated for the consumer account 515 (e.g., a new EC2 cluster of small size, such as four virtual machines), a new database instance is generated on the new virtual warehouse, and data from the share object is used to populate the database. In this way, the consumer account handles the compute resources without affecting the systems of the data provider (e.g., without affecting a projection server of the database provider that generates and stores data 510).

FIG. 7E shows a user interface 745 for interacting with the share object data, according to some example embodiments. Continuing the example, a user of the consumer account 515 can use user interface 745 to interact with the share object data on the newly created warehouse. For instance, the side panel 750 lists data that is managed by the newly created warehouse (e.g., "ORG_PATIENTS" under the "VIEWS" tab), the execution area 755 can receive code to execute against the share object data, and the results of the executed code is displayed in the output window 760. For instance, a user of the consumer account 515 can input a SQL query into the execution area 755, which is then executed against the share object data in the newly created database running on the new warehouse created by the consumer account in FIG. 7D. In this way, users of the consumer accounts can access and interact with live production data of the provider account in a secure manner, where updates to the share object data (e.g., production server updates from which the share object data is derived) occur in real time, and the consumer's computations do not impinge the provider account systems as the computations are performed on a virtual warehouse created and managed by consumer account 515.

Figure 8:
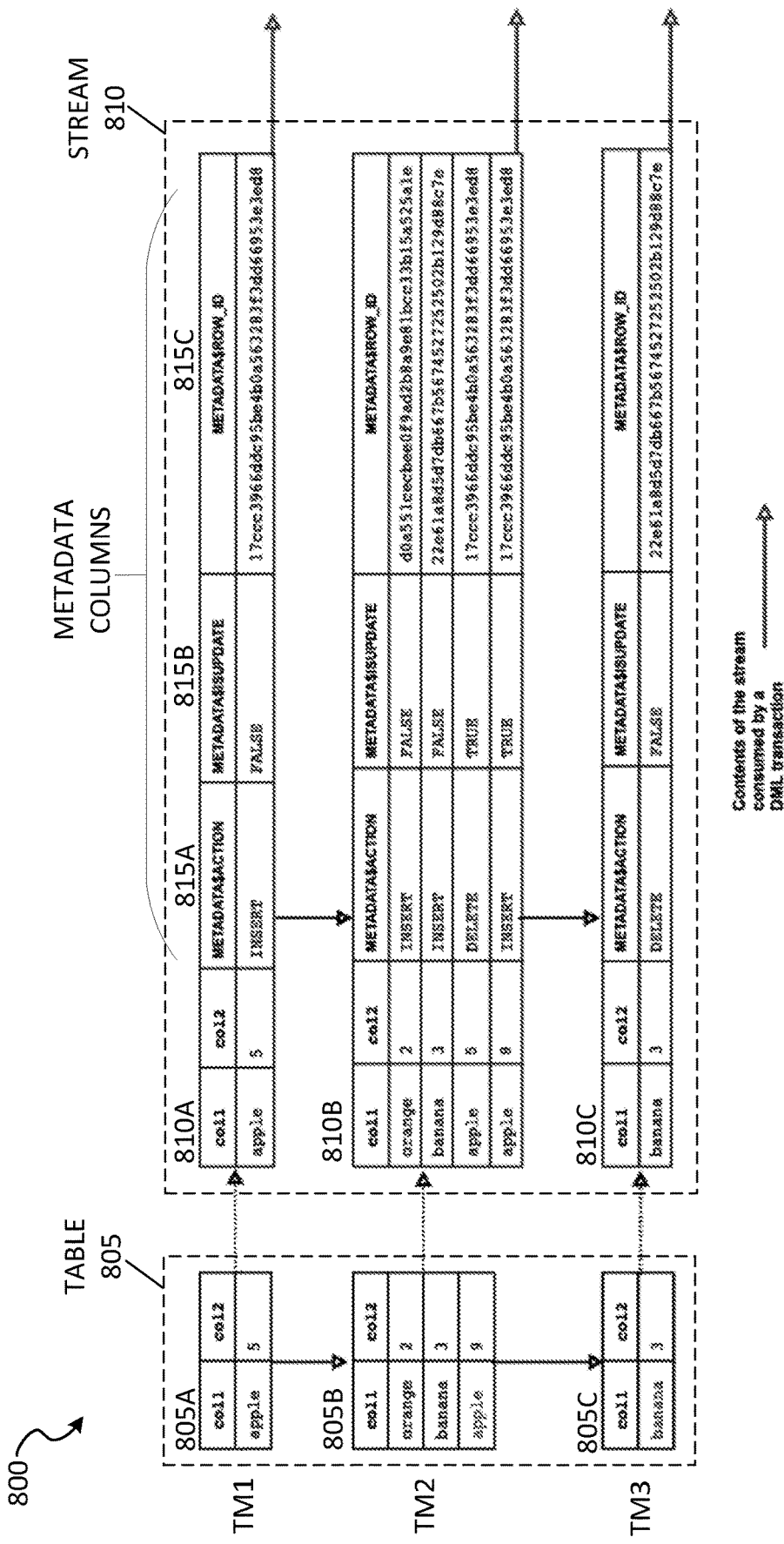
FIG. 8 shows an example stream object and table object, according to some example embodiments.

FIG. 8 shows an example data architecture 800 of a database stream object tracking changes on a table, according to some example embodiments. The stream object tracks changes by taking advantage of metadata columns in the base table which are maintained by the DML operations on the data. As illustrated, a source table 805 comprises two example columns, col1 for fruit type, and col2 for quantity, where each of the versions 805A, 805B, and 805C is the source table 805 at different times (e.g., transaction times). The stream 810 can be created using a create statement specifying the tracked object, e.g., inputting "create stream S1 on table T1" into execution area 755 (FIG. 7E). In response to the stream instruction, the stream 810 is created by appending metadata columns 815A-C onto the table being tracked, source table 805, where each of versions 810A, 810B, and 810C is the stream 810 at different times (e.g., after different transactions commit that perform one or more row level changes).

Whenever a DML statement consumes the streams contents, the stream position advances to track the next set of DML changes to the table (e.g., changes to the table version at time_1 of a first transaction, time_2 of a second transaction, and time_3 of a third transaction). In the illustrated example, metadata column 815A indicates a type of operation, such as insert, update, or delete; metadata column 815B indicates whether the operation is part of an update operation (e.g., where insert and delete are both used in a single update operation); and the metadata column 815C is a unique key for a given row that is immutable and can be used to track ranges to a specific row over time.

In the illustrated example, at first time TM1, the apple row is inserted and the stream 810 is updated to indicate the row level data that was inserted as shown in version 810A. At TM1, the stream 810 can be queried (e.g., "select * from" statement specifying stream 810) to determine what changes have been made by the last transaction (e.g., insert the apple row) and data from version 810A is returned, which can be examined in output window 760. At a later time TM2, the orange and banana rows are added with respective quantities to the source table 805 and the apple row (e.g., corresponding to a metadata column 815C with the last three values of " . . . ed8") has its quantity updated from 3 to 9, thereby creating table version 805B. At TM2, if stream 810 is queried to view the last changes (e.g., "select * from" on stream 810, after the changes are made to produce table version 805B), some or all of the data from stream version 810B is returned, e.g., displayed in output window 760. That is, for example, at TM2, two rows involving the apple row can be returned; apple row of quantity 5 is deleted and apple row of quantity 9 is inserted; and the apple row of quantity 5 being inserted is not returned as that data is the last iteration or version of the stream, version 810A of TM1. Continuing, at a later time TM3, the banana row is deleted to create the table version 805C. At TM3, if the stream 810 is queried for all its data (e.g., a select statement, as above), the only change returned is from 810C version of the stream, of the banana row being deleted.

Figure 9:
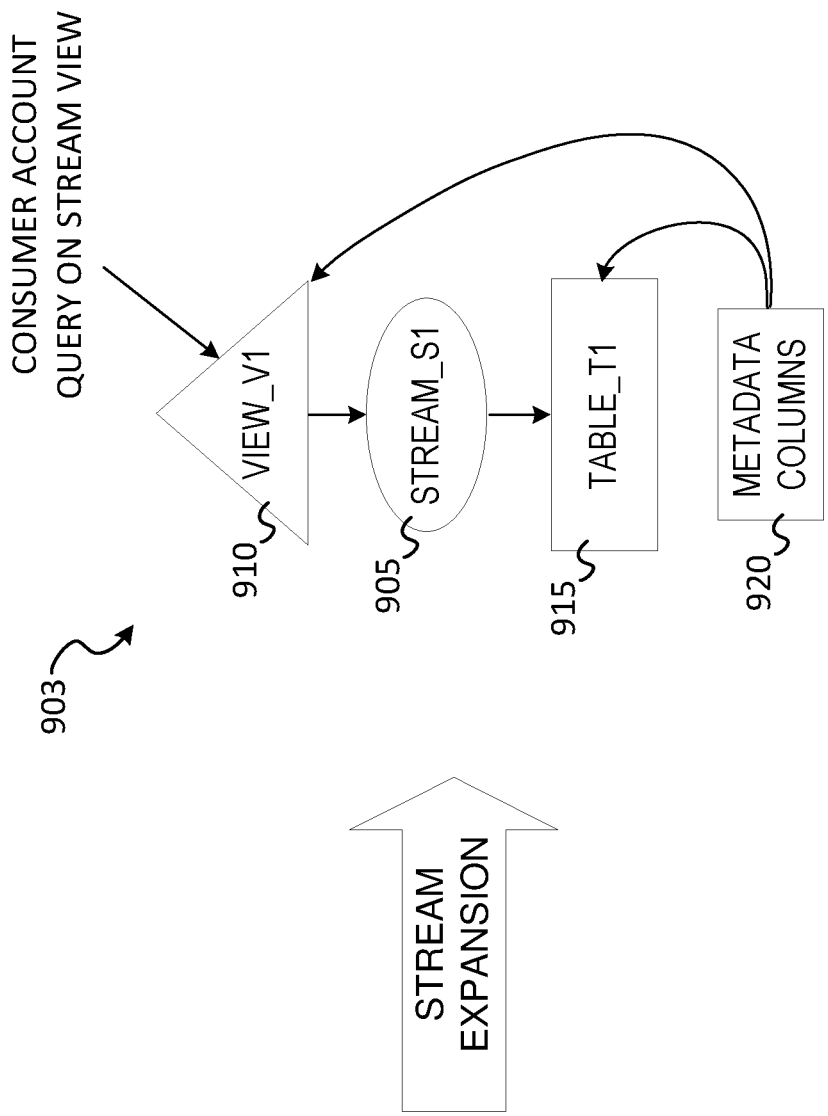
FIG. 9 shows example stream expansions, according to some example embodiments.
Figure 9:
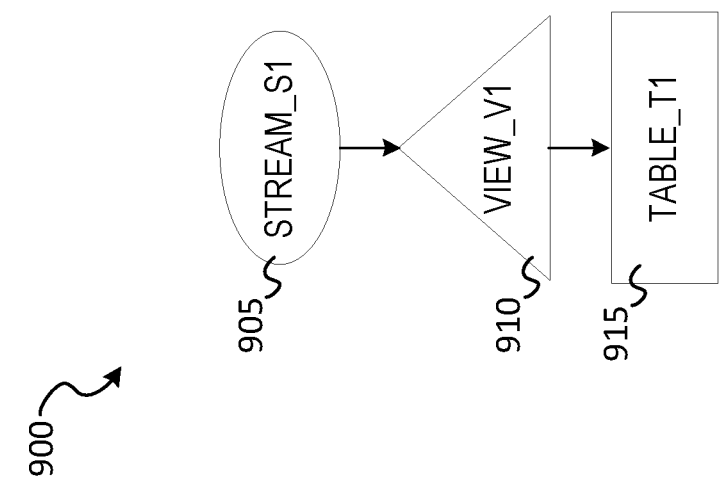

FIG. 9 shows stream architecture 900 and expanded architecture 903, according to some example embodiments. As discussed above, a stream object maintains a position in the list of change sets, and the stream object is only advanced when it is used in a DML statement. Reading from the stream returns the change set from the current position up to the current transactional time stamp. As the underlying data changes, the size of the change set will grow until the stream is advanced. In stream architecture 900, a table 915 stores relational database data, and the view 910 is a query definition that is applied to the table 915 such that the view 910 can be query-able as a table itself. The view 910 may, for example, display only the first two columns of the table 915 (e.g., user name column, and age column) and not include remaining columns (e.g., private data of users, such as social security numbers, address data, etc.) or rows that meet one or more specified conditions (e.g., do not include users below 20 years of age). In some example embodiments, a request to create a stream 905 to track changes on the view 910 is received. For example, a data provider can create and manage the table 915 and view 910, and share the view 910 with a data consumer. The data consumer then inputs a database statement (e.g., into execution area 755) to generate the stream 905 on the view 910, where for example the data consumer has access to the view 910 but not access to the table 915 (e.g., the view 910 is a secure view).

In some example embodiments, in response to receiving the request to create the stream 905 on the view 910, the stream share engine 225 expands the query plan structure by rearranging the stream 905 such that it is applied directly to the table 915 as shown in architecture 903. In some example embodiments, the stream is rearranged via sub-query expansion operation that replaces the original query with a sub-query that reorders and/or modifies the operations requested in the query. For example, while the original query may query the stream-on-view object, the sub-query that replaces the original query first returns the change tracking data on the stream on the source table, and then filters the change data of the source table using the view, which is then stored as stream on view change data.

In some example embodiments, as the data in the table 915 changes, metadata columns 920 track the changes to create a change set for different times (e.g., after a given DML) for the stream 905. The change set for the stream 905 is then used with the view 910 to create the streaming change of the view (e.g., in a subquery executed when the stream on the view is queried). For example, with reference to architecture 903, the change set can include insertion of a row in stream 905, and the view 910 is applied to the change set data to include only the first two columns, where inclusion of only the first two columns is in the query definition of the view 910. The resulting effect is that operations on the view 910 in the expanded architecture 903 appear as if a stream on a view is occurring, when instead a sub-query plan is executed that: applies the stream on a table to access the most recent change set (e.g., since the last transaction commit), and filters the change set data using the definition of the view 910 to yield the stream on view data for display.

Figure 10:
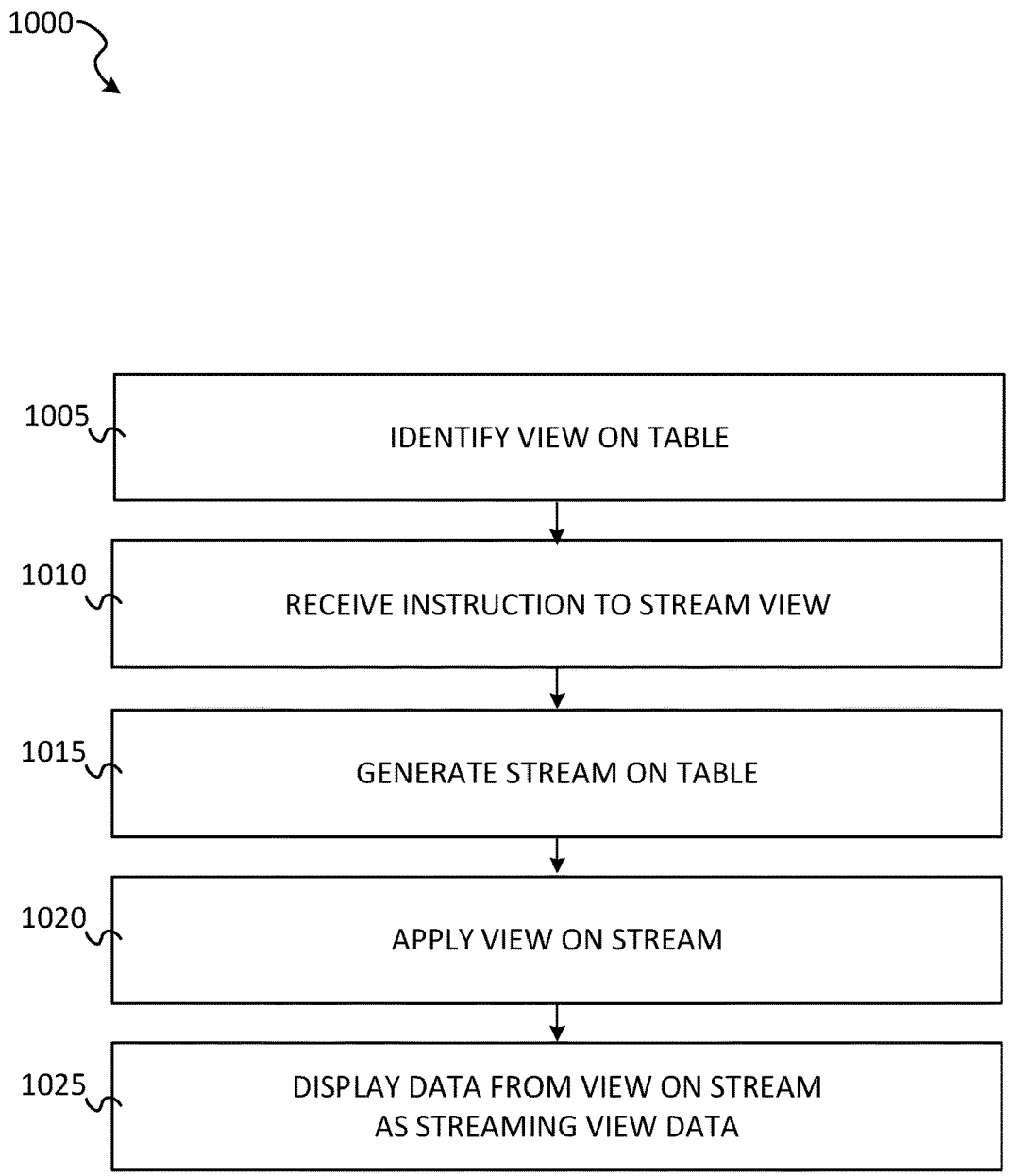
FIG. 10 shows a flow diagram of a method for implementing streams on views, according to some example embodiments.

FIG. 10 shows a flow diagram of a method 1000 for implementing streams on views, according to some example embodiments. At operation 1005, the stream share engine 225 identifies a view on a table. For example, a data consumer account can receive notification that a view created by a data provider account has been shared with the data consumer account. At operation 1010, the stream share engine 225 receives an instruction to perform stream tracking on the view. For example, the data consumer account inputs a create stream on view instruction into the execution area 755.

In response to receiving the stream view instruction, at operation 1015, the stream share engine 225 generates a stream on the source table used to create the view. That is, instead of creating a database stream object on the view per the instruction, the stream is created on the underlying source table from which the stream is created.

At operation 1020, the stream share engine 225 applies the view on the stream data. For example, as changes to the base table occur, the change set of the stream on the table is likewise modified as discussed in FIG. 8 above. Then, in response to a query specifying the stream, the query is expanded (e.g., subquery expansion) to apply the view definition on the stream object to generate the stream on view data. At operation 1025, stream share engine 225 displays data generated by applying the view on the stream data.

In some example embodiments, in order for a consumer account to stream changes on a shared object (e.g., shared view, shared table) the shared object must have change tracking already enabled. That is, for example, in order for the consumer account to successfully perform a stream on shared view operation, the view and/or the underlying table must have already had change tracking enabled by the data provider account. In those example embodiments where change tracking has not been turned on, on the data provider's side, the data consumer may receive an error notification upon attempting to create a stream on a shared object, e.g., shared view. In some example embodiments, if change tracking and streams are not already enabled on the provider account side, the share engine 225 turns change tracking on, on the provider account's side, to generate a stream on the table for use by the stream-on-view sub-query plan.

Further, it is appreciated that although streams on views are discussed in the illustrated examples, the stream share engine 225 can be implemented to perform streams on database objects other than views. For example, in some example embodiments, the stream share engine 225 can implement streams on database share objects (e.g., share 1 in FIG. 5) in a similar manner. For instance, a database consumer may have access to view the share but not access to the underlying data in the share. In those example embodiments, the data consumer can issue a stream on share instruction, which is implemented by the stream share engine 225 by generating a stream on the underlying data of the share, then providing access to the stream data through the share.

Figure 11:
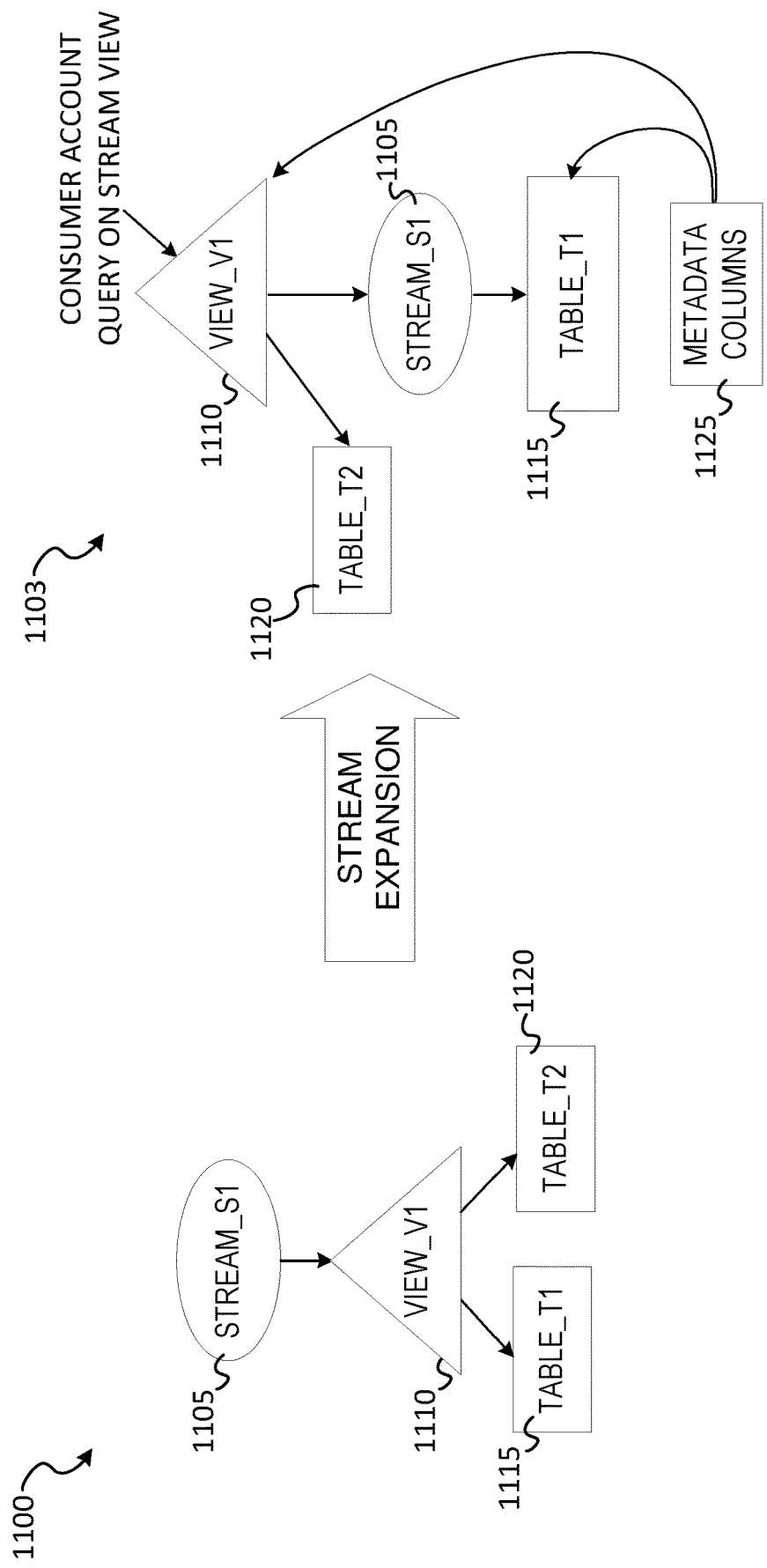
FIG. 11 shows example stream expansions using multiple tables, according to some example embodiments.

FIG. 11 shows stream architecture 1100 and expanded stream architecture 1103, according to some example embodiments. In stream architecture 1100, table 1115 and table 1120 store relational database data, and the view 1110 is a query definition that incorporates data from table 1115 and table 1120 such that the view 1110 can be query-able as if it is a table itself. In some example embodiments, a request to create a stream 1105 to track changes on the view 1110 is received. For example, a data provider can create and manage the table 1115, the table 1120, and view 1110, and then share the view 1110 with a data consumer. The data consumer then generates a database statement to generate the stream 1105 on the view 1110, where for example the data consumer has access to the view 1110 but not access to the source data (e.g., table 1115, table 1120).

In some example embodiments, in response to receiving the request to create the stream 1105 on the view 1110, the stream share engine 225 expands the architecture 1100 by rearranging the stream 1105 such that it is applied directly to the table 1115 as shown in architecture 1103 (e.g., via a subquery plan executed in response to a query on the stream on view).

As the data in the table 1115 changes, data in metadata columns 1125 track the changes to create a change set for different times (e.g., after a given DML) for the stream 1105. The change set for the stream 1105 is then used with the view 1110 to create the streaming change of the view. For example, the change set can include insertion of a row in stream 1105, and the view 1110 is applied to the change set data to include only the first two columns, where inclusion of only the first two columns is in the query definition of the view 1110. Further, the view 1110 incorporates data (e.g., columns, rows) from table 1120 where change tracking is not enabled for table 1120. That is, for example, the expanded architecture 1103 tracks a view that pulls data from multiple tables, where only one of the tables has change tracking enabled (e.g., table 1115) and one or more other tables are static (e.g., 1120). The resulting effect is that queries to expanded stream architecture 1103 appear as if a stream on a view 1110 is occurring, when instead a stream on a table is occurring, followed by filtering by the query definition of the view 1110. In this way, streams on views that pull data can be implemented, where some of the data is static and not tracked but may be used for subsequent data analysis and operations (e.g., user names, which generally remain static), and other data in the stream view is dynamic and tracked per transaction (e.g., bank accounts with fluctuating values, etc.).

Figure 12:
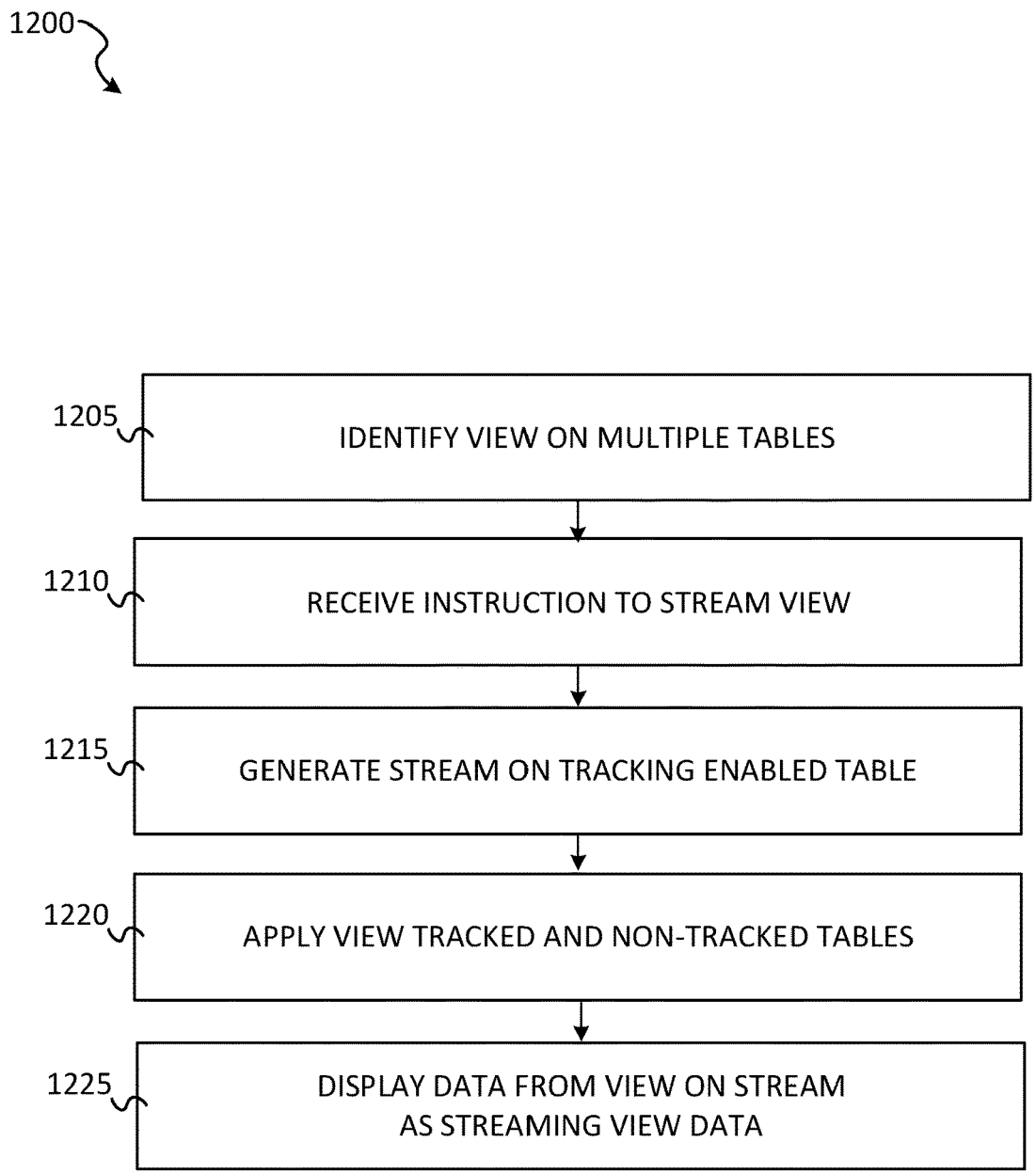
FIG. 12 shows a flow diagram of a method for implementing streams on views using multiple tables, according to some example embodiments.

FIG. 12 shows a flow diagram of a method 1200 for implementing streams on views where the view incorporates data from multiple tables, according to some example embodiments. At operation 1205, the stream share engine 225 identifies a view on multiple tables. For example, a data consumer account can receive notification that a view created by a data provider account has been shared with the data consumer account, where the view pulls a username column from a first table and pulls an account balance column from a second table. At operation 1210, the stream share engine 225 receives an instruction to perform stream tracking on the view. For example, the data consumer account inputs a create-stream-on-view instruction into the execution area 755 (FIG. 7E).

In response to receiving the stream instruction, at operation 1215, the stream share engine 225 generates a stream on one of the source tables used to create the view. For example, the stream is created on the second table that tracks account balance data (e.g., checking account data) which is to be tracked, while the data in the first table is static and not tracked.

At operation 1220, the stream share engine 225 applies the view on the stream data. For example, as changes to the second table occur (e.g., account balances change for different users), the change set of the stream on the table is likewise modified. Then, in response to a query specifying the stream, the query is expanded to apply the view definition on the stream object to generate the stream on view data. In the multiple table embodiment, the view pulls change data from the stream on the tracked table (the second account balances table) and pulls other data from the non-tracked table (e.g., usernames) to complete the view definition. At operation 1225, stream share engine 225 displays data generated by applying the view on the stream data (e.g., in output window 760 in FIG. 7E).

Figure 13:
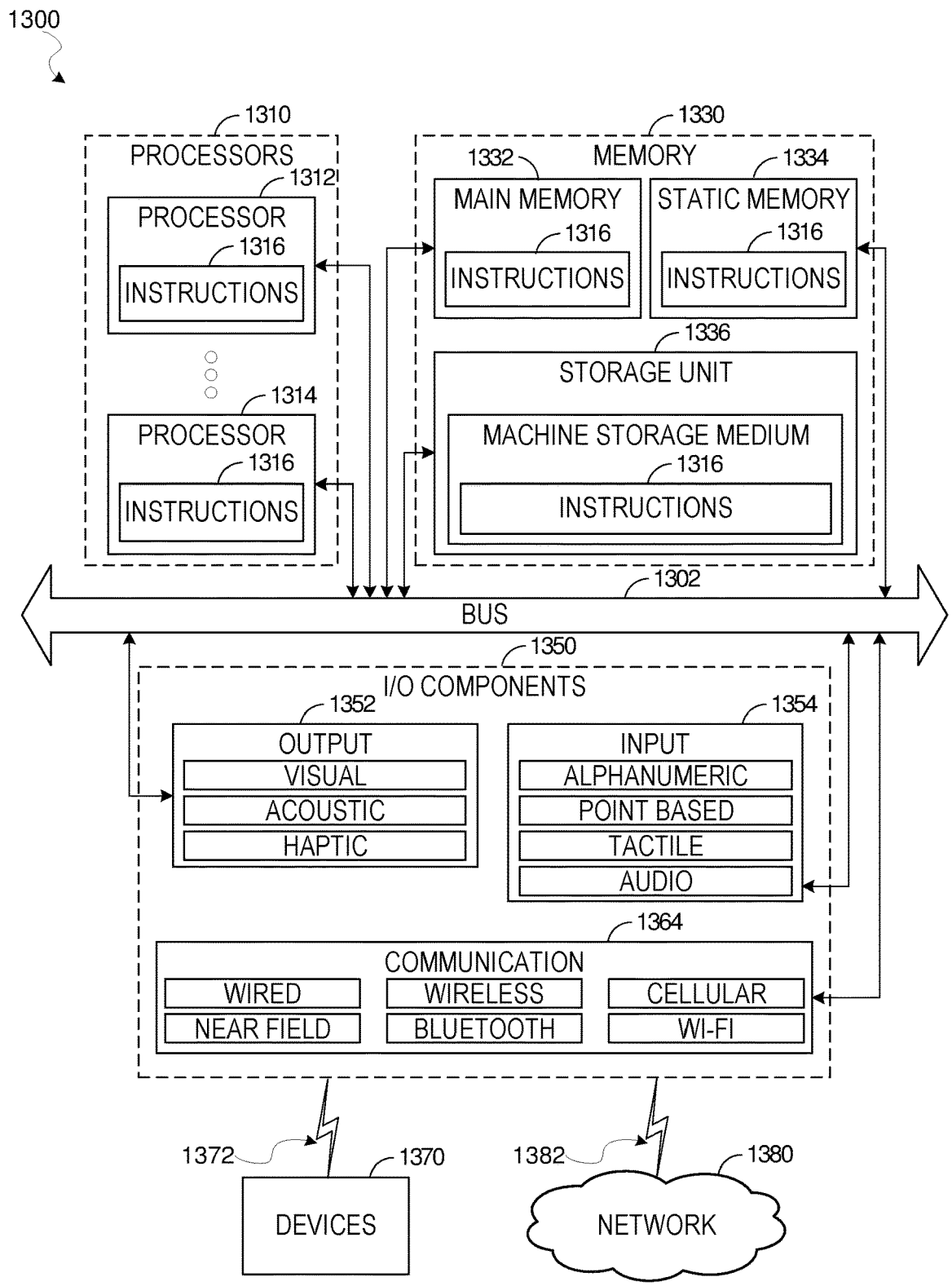
FIG. 13 illustrates a diagrammatic representation of a machine in the form of a computer system within which a set of instructions may be executed for causing the machine to perform any one or more of the methodologies discussed herein, in accordance with some embodiments of the present disclosure.

FIG. 13 illustrates a diagrammatic representation of a machine 1300 in the form of a computer system within which a set of instructions may be executed for causing the machine 1300 to perform any one or more of the methodologies discussed herein, according to an example embodiment. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. For example, the instructions 1316 may cause the machine 1300 to execute any one or more operations of any one or more of the methods 1000 and 1200. As another example, the instructions 1316 may cause the machine 1300 to implemented portions of the data flows illustrated in any one or more of FIGS. 1-9. In this way, the instructions 1316 transform a general, non-programmed machine into a particular machine 1300 (e.g., the remote computing device 106, the access management system 110, the compute service manager 112, the execution platform 113, the access management system 118, the Web proxy 120, remote computing device 106) that is specially configured to carry out any one of the described and illustrated functions in the manner described herein.

In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any one or more of the methodologies discussed herein.

The machine 1300 includes processors 1310, memory 1330, and input/output (I/O) components 1350 configured to communicate with each other such as via a bus 1302. In an example embodiment, the processors 1310 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1312 and a processor 1314 that may execute the instructions 1316. The term "processor" is intended to include multi-core processors 1310 that may comprise two or more independent processors (sometimes referred to as "cores") that may execute instructions 1316 contemporaneously. Although FIG. 13 shows multiple processors 1310, the machine 1300 may include a single processor with a single core, a single processor with multiple cores (e.g., a multi-core processor), multiple processors with a single core, multiple processors with multiple cores, or any combination thereof.

The memory 1330 may include a main memory 1332, a static memory 1334, and a storage unit 1336, all accessible to the processors 1310 such as via the bus 1302. The main memory 1332, the static memory 1334, and the storage unit 1336 store the instructions 1316 embodying any one or more of the methodologies or functions described herein. The instructions 1316 may also reside, completely or partially, within the main memory 1332, within the static memory 1334, within the storage unit 1336, within at least one of the processors 1310 (e.g., within the processor's cache memory), or any suitable combination thereof, during execution thereof by the machine 1300.

The I/O components 1350 include components to receive input, provide output, produce output, transmit information, exchange information, capture measurements, and so on. The specific I/O components 1350 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1350 may include many other components that are not shown in FIG. 13. The I/O components 1350 are grouped according to functionality merely for simplifying the following discussion and the grouping is in no way limiting. In various example embodiments, the I/O components 1350 may include output components 1352 and input components 1354. The output components 1352 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1354 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 may include a network interface component or another suitable device to interface with the network 1380. In further examples, the communication components 1364 may include wired communication components, wireless communication components, cellular communication components, and other communication components to provide communication via other modalities. The devices 1370 may be another machine or any of a wide variety of peripheral devices (e.g., a peripheral device coupled via a universal serial bus (USB)). For example, as noted above, the machine 1300 may correspond to any one of the remote computing device 106, the access management system 110, the compute service manager 112, the execution platform 113, the access management system 118, the Web proxy 120, and the devices 1370 may include any other of these systems and devices.

The various memories (e.g., 1330, 1332, 1334, and/or memory of the processor(s) 1310 and/or the storage unit 1336) may store one or more sets of instructions 1316 and data structures (e.g., software) embodying or utilized by any one or more of the methodologies or functions described herein. These instructions 1316, when executed by the processor(s) 1310, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1380 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1380 or a portion of the network 1380 may include a wireless or cellular network, and the coupling 1382 may be a Code Division Multiple Access (CDMA) connection, a Global System for Mobile communications (GSM) connection, or another type of cellular or wireless coupling. In this example, the coupling 1382 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1316 may be transmitted or received over the network 1380 using a transmission medium via a network interface device (e.g., a network interface component included in the communication components 1364) and utilizing any one of a number of well-known transfer protocols (e.g., hypertext transfer protocol (HTTP)). Similarly, the instructions 1316 may be transmitted or received using a transmission medium via the coupling 1372 (e.g., a peer-to-peer coupling) to the devices 1370. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1316 for execution by the machine 1300, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods 1000 and 1200 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

The following numbered examples are embodiments:

Example 1. A method comprising: identifying, by one or more processors of a machine, a database view of one or more source tables of a database platform; receiving a request to track changes made to the database view by using a database stream object on the database view, the database stream object recording one or more row level changes to the database view caused by one or more database transactions, the one or more row level changes being tracked in a change table of the database stream object; and in response to the request to track changes of the database view by using the database stream object, applying the database stream object on the one or more source tables to record changes made to the one or more source tables using the change table and applying the database view on the change table.

Example 2. The method of example 1, further comprising: receiving a query for change data from the database stream object on the database view; generating intermediate change data by applying the query to the change table that tracks changes made to the one or more source tables; generating the change data by applying the database view on the intermediate change data; and storing the change data.

Example 3. The method of any of examples 1 and 2, wherein the one or more source tables comprises a plurality of tables, and wherein the database view is generated from the plurality of tables.

Example 4. The method of any of examples 1 to 3, wherein the change table comprises indications of changes to one of the plurality of tables.

Example 5. The method of any of examples 1 to 4, wherein changes to other tables of the plurality of tables are not indicated in the change table.

Example 6. The method of any of examples 1 to 5, further comprising: generating the database stream object at least in part by appending metadata columns to the one or more source tables to generate the change table.

Example 7. The method of any of examples 1 to 6, wherein the metadata columns describe the one or more row level changes made in each transaction of the one or more database transactions.

Example 8. The method of any of examples 1 to 7, wherein the one or more row level changes described by the metadata columns include one or more of: an insert operation, an update operation, or a delete operation.

Example 9. The method of any of examples 1 to 8, wherein the database view and the one or more source tables are managed by a data provider end-user of the database platform, and the database stream object is managed by a data consumer end-user of the database platform.

Example 10. The method of any of examples 1 to 9, further comprising: receiving, from the data provider end-user, a request to share the database view on the database platform with the data consumer end-user without sharing the one or more source tables with the data consumer end-user; and causing, on a user device of the data consumer end-user, display of data from the database view.

Example 11. The method of any of examples 1 to 10, wherein the database platform comprises a distributed database.

Example 12. The method of any of examples 1 to 11, wherein the database view comprises a table definition specifying data to include in the database view from the one or more source tables.

Example 13. The method of any of examples 1 to 12, wherein each of the one or more database transactions includes one or more read operations or write operations.

Example 14. A system comprising: one or more processors of a machine; and a memory storing instructions that, when executed by the one or more processors, cause the machine to perform operations implementing any one of example methods 1 to 13.

Example 15. A machine-readable storage device embodying instructions that, when executed by a machine, cause the machine to perform operations implementing one of methods 1 to 13.

What is claimed is:

1. A method comprising:
   identifying, by one or more processors of a machine, a database view of one or more source tables of a database platform, the database view comprising a table definition specifying data to include in the database view from the one or more source tables;
   receiving a query that specifies a database stream object to be applied to the database view to track changes made to the database view, the database stream object recording one or more row level changes to the database view caused by one or more database transactions, the one or more row level changes being tracked in a change table of the database stream object; and
   in response to the query, performing query expansion to rearrange a query plan such that the database stream object is applied to the one or more source tables and the database view is applied to the change table;
   receiving an additional query for change data from the database stream object;
   generating, using the rearranged query plan, the change data by generating intermediate change data by applying the additional query to the change table that tracks changes made to the one or more source tables and applying the database view on the intermediate change data to generate the change data; and
   storing the change data.

2. The method of claim 1, wherein the one or more source tables comprises a plurality of tables, and wherein the database view is generated from the plurality of tables.

3. The method of claim 2, wherein the change table comprises indications of changes to one of the plurality of tables.

4. The method of claim 3, wherein changes to other tables of the plurality of tables are not indicated in the change table.

5. The method of claim 1, further comprising:
   generating the database stream object at least in part by appending metadata columns to the one or more source tables to generate the change table.

6. The method of claim 5, wherein the metadata columns describe the one or more row level changes made in each transaction of the one or more database transactions.

7. The method of claim 6, wherein the one or more row level changes described by the metadata columns include one or more of: an insert operation, an update operation, or a delete operation.

8. The method of claim 1, wherein the database view and the one or more source tables are managed by a data provider end-user of the database platform, and the database stream object is managed by a data consumer end-user of the database platform.

9. The method of claim 8, wherein the database view is a secure database view having restricted access to tables from which the secure database view includes data, and wherein the method further comprises:
   receiving, from the data provider end-user, a request to share the secure database view on the database platform with the data consumer end-user without enabling access to the one or more source tables by the data consumer end-user; and
   causing, on a user device of the data consumer end-user, display of data from the secure database view.

10. The method of claim 1, wherein the one or more source tables comprises a plurality of tables, and wherein the database view includes data from different tables of the plurality of tables using a join operation included in the database view.

11. The method of claim 1, wherein each of the one or more database transactions includes one or more read operations or write operations.

12. A system comprising:
    one or more processors of a machine; and
    a memory storing instructions that, when executed by the one or more processors, cause the machine to perform operations comprising:
    identifying, in a database platform, a database view of one or more source tables, the database view comprising a table definition specifying data to include in the database view from the one or more source tables;
    receiving a query that specifies a database stream object to be applied to the database view to track changes made to the database view, the database stream object recording one or more row level changes to the database view caused by one or more database transactions, the one or more row level changes being tracked in a change table of the database stream object; and
    in response to the query, performing query expansion to rearrange a query plan such that the database stream object is applied to the one or more source tables and the database view is applied to the change table;
    receiving an additional query for change data from the database stream object;
    generating, using the rearranged query plan, the change data by generating intermediate change data by applying the additional query to the change table that tracks changes made to the one or more source tables and applying the database view on the intermediate change data to generate the change data; and
    storing the change data.

13. The system of claim 12, wherein the one or more source tables comprises a plurality of tables, and wherein the database view is generated from the plurality of tables.

14. The system of claim 13, wherein the change table comprises indications of changes to one of the plurality of tables.

15. The system of claim 14, wherein changes to other tables of the plurality of tables are not indicated in the change table.

16. The system of claim 12, the operations further comprising:
generating the database stream object at least in part by appending metadata columns to the one or more source tables to generate the change table.

17. The system of claim 16, wherein the metadata columns describe the one or more row level changes made in each transaction of the one or more database transactions.

18. The system of claim 17, wherein the one or more row level changes described by the metadata columns include one or more of: an insert operation, an update operation, or a delete operation.

19. The system of claim 12, wherein the database view and the one or more source tables are managed by a data provider end-user of the database platform, and the database stream object is managed by a data consumer end-user of the database platform.

20. The system of claim 19, wherein the database view is a secure database view having restricted access to tables from which the secure database view includes data, and wherein the operations further comprise:
receiving, from the data provider end-user, a request to share the secure database view on the database platform with the data consumer end-user without enabling access to the one or more source tables by the data consumer end-user; and
causing, on a user device of the data consumer end-user, display of data from the secure database view.

21. The system of claim 12, wherein the one or more source tables comprises a plurality of tables, and wherein the database view includes data from different tables of the plurality of tables using a join operation included in the database view.

22. The system of claim 12, wherein each of the one or more database transactions includes one or more read operations or write operations.

23. A machine storage medium embodying instructions that, when executed by a machine, cause the machine to perform operations comprising:
identifying, in a database platform, a database view of one or more source tables, the database view comprising a table definition specifying data to include in the database view from the one or more source tables;
receiving a query that specifies a database stream object to be applied to the database view to track changes made to the database view, the database stream object recording one or more row level changes to the database view caused by one or more database transactions, the one or more row level changes being tracked in a change table of the database stream object; and
in response to the query, performing query expansion to rearrange a query plan such that the database stream object is applied to the one or more source tables and the database view is applied to the change table;
receiving an additional query for change data from the database stream object;
generating, using the rearranged query plan, the change data by generating intermediate change data by applying the additional query to the change table that tracks changes made to the one or more source tables and applying the database view on the intermediate change data to generate the change data; and
storing the change data.

24. The machine storage medium of claim 23, wherein the one or more source tables comprises a plurality of tables, and wherein the database view is generated from the plurality of tables.

25. The machine storage medium of claim 24, wherein the change table comprises indications of changes to one of the plurality of tables.

26. The machine storage medium of claim 25, wherein changes to other tables of the plurality of tables are not indicated in the change table.

27. The machine storage medium of claim 23, the operations further comprising:
generating the database stream object at least in part by appending metadata columns to the one or more source tables to generate the change table.

28. The machine storage medium of claim 27, wherein the metadata columns describe the one or more row level changes made in each transaction of the one or more database transactions.

29. The machine storage medium of claim 28, wherein the one or more row level changes described by the metadata columns include one or more of: an insert operation, an update operation, or a delete operation.

30. The machine storage medium of claim 23, wherein the database view and the one or more source tables are managed by a data provider end-user of the database platform, and the database stream object is managed by a data consumer end-user of the database platform.

* * * * *

UNITED STATES PATENT AND TRADEMARK OFFICE
CERTIFICATE OF CORRECTION

PATENT NO. : 11,086,841 B1
APPLICATION NO. : 16/779045
DATED : August 10, 2021
INVENTOR(S) : Cseri et al.

Page 1 of 1

It is certified that error appears in the above-identified patent and that said Letters Patent is hereby corrected as shown below:

On the Title Page

Add item (65):
(65) Prior Publication Data
US 2021/0240690 A1 Aug. 5, 2021

In the Claims

In Column 26, Line 57, in Claim 12, delete "object:" and insert --object;-- therefor Signed and Sealed this
Sixteenth Day of November, 2021

Drew Hirshfeld
*Performing the Functions and Duties of the
Under Secretary of Commerce for Intellectual Property and
Director of the United States Patent and Trademark Office*